(12) United States Patent
Uchida et al.

(10) Patent No.: US 6,747,209 B2
(45) Date of Patent: Jun. 8, 2004

(54) CLAMP

(75) Inventors: Yoshimi Uchida, Mie (JP); Takeharu Ito, Mie (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 10/454,892

(22) Filed: Jun. 5, 2003

(65) Prior Publication Data

US 2003/0234116 A1 Dec. 25, 2003

(30) Foreign Application Priority Data

Jun. 19, 2002 (JP) .......................... 2002-179046
Sep. 10, 2002 (JP) .......................... 2002-264685

(51) Int. Cl.[7] .................................... H02G 3/04
(52) U.S. Cl. ............... 174/68.1; 174/68.3; 174/135; 174/72 A; 248/73
(58) Field of Search ............... 174/68.1, 135, 174/72 A, 72 C, 97, 68.3; 52/220.3; 439/34; 248/65, 73, 71, 68.1

(56) References Cited

U.S. PATENT DOCUMENTS

| | | | | |
|---|---|---|---|---|
| 3,210,032 A | * | 10/1965 | Slyke ........................ | 248/73 |
| 4,918,261 A | * | 4/1990 | Takahashi et al. .......... | 174/135 |
| 5,905,231 A | * | 5/1999 | Houte et al. ............... | 174/68.3 |
| 6,417,451 B1 | * | 7/2002 | Uchiyama .................. | 174/72 A |
| 6,677,526 B2 | * | 1/2004 | Kishizawa ................. | 174/68.1 |

FOREIGN PATENT DOCUMENTS

| | | |
|---|---|---|
| JP | 2-94992 | 7/1990 |
| JP | 4-32580 | 3/1992 |
| JP | 4-35656 | 8/1992 |
| JP | 9-189376 | 7/1997 |

\* cited by examiner

*Primary Examiner*—Dhiru Patel
(74) *Attorney, Agent, or Firm*—Harness, Dickey & Pierce P.L.C.

(57) ABSTRACT

A clamp has an annular strap section enclosing an interior space and defining an opening between opposite ends of the strap section. A pair of insertion engagement sections are at opposite ends of the strap section. The insertion engagement sections stand outwardly and oppose each other at opposite ends of the opening. Each insertion engagement section includes an axle plate portion projecting from an end of the opening. A wing portion is bent down from a distal end of the axle plate portion. A stepped latching portion is formed on a distal end of the wing portion. A dimension of the opening is set to be narrower than a diameter of a wire harness to be contained in the interior space. The clamp contains the wire harness in the interior space while the annular strap section is elastically bent outwardly to widen the opening. After receiving the wire harness in the interior space, the annular strap section returns to its original position by elastic recovery to narrow the opening, thereby holding the wire harness in the interior space. The pair of insertion engagement sections are inserted into a through-hole in the car body panel. After inserting the sections into the through-hole, the stepped latching portions engage a periphery of the through-hole to lock the wire harness on a car body.

8 Claims, 28 Drawing Sheets

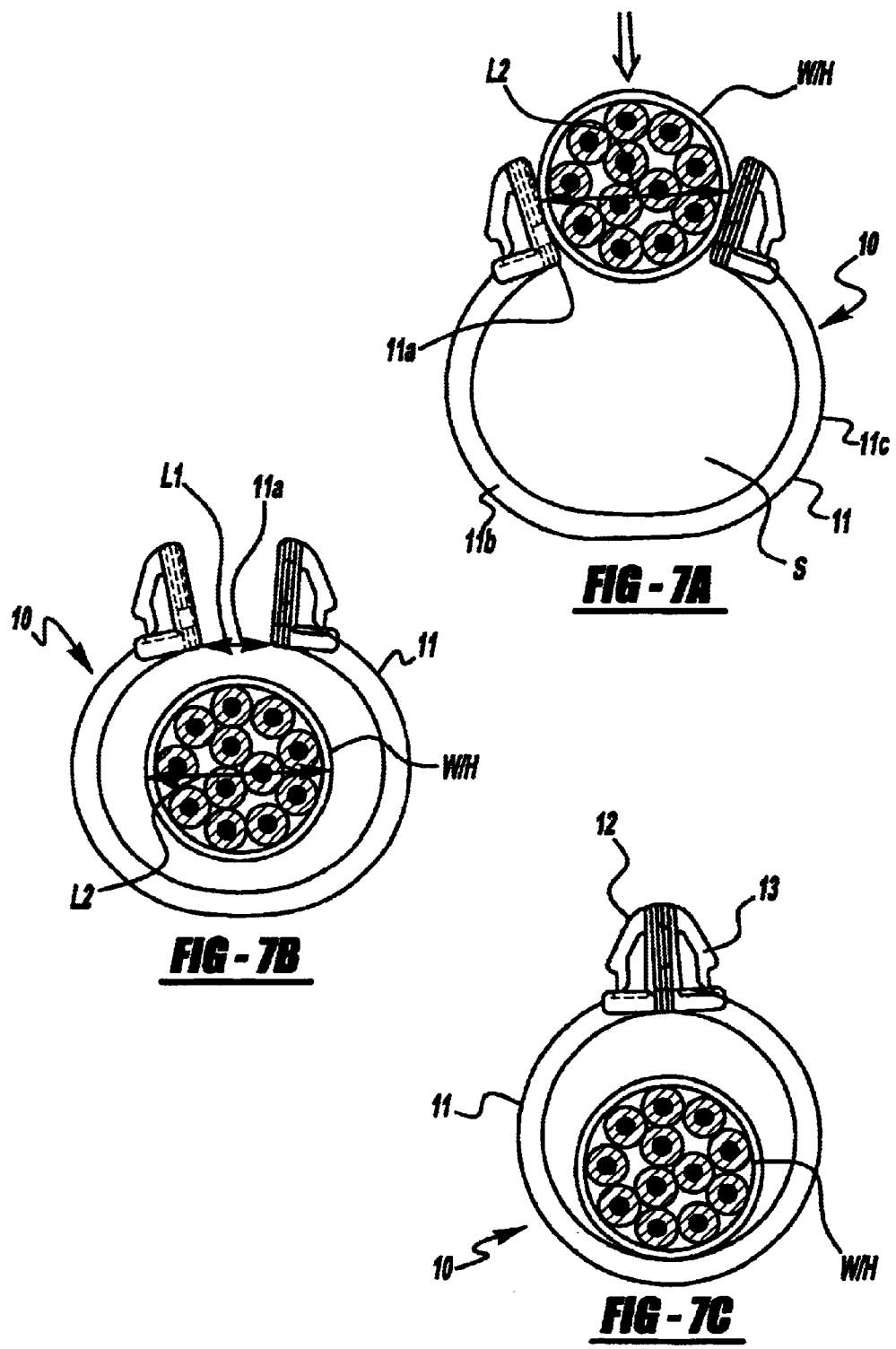

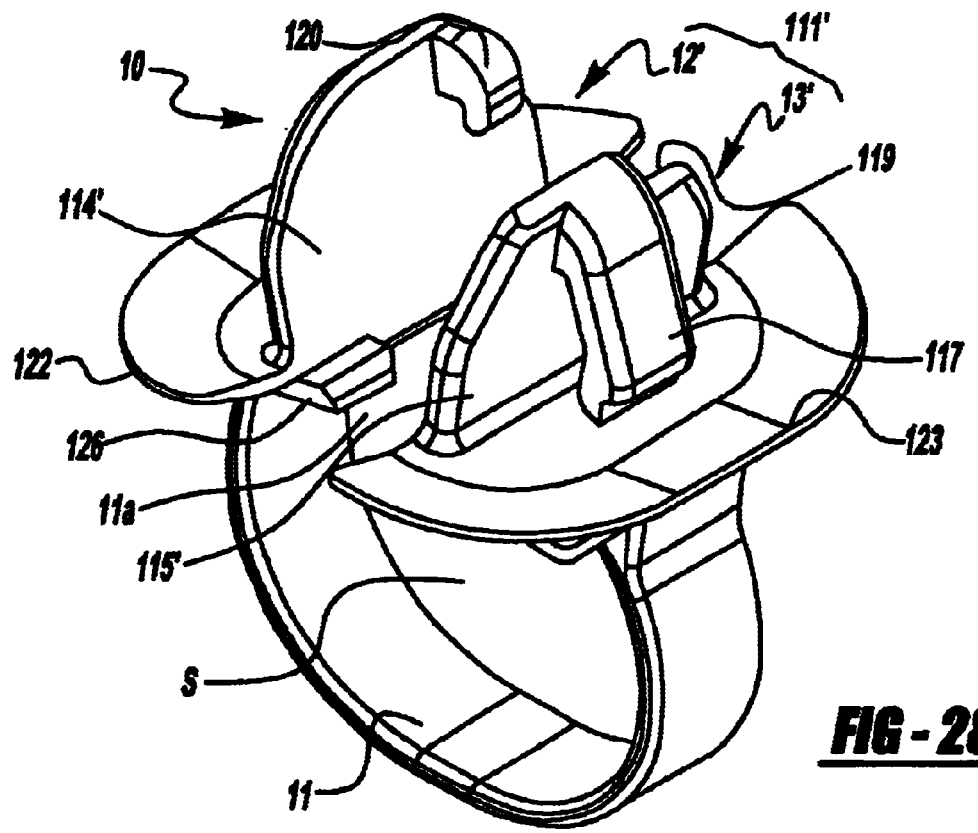
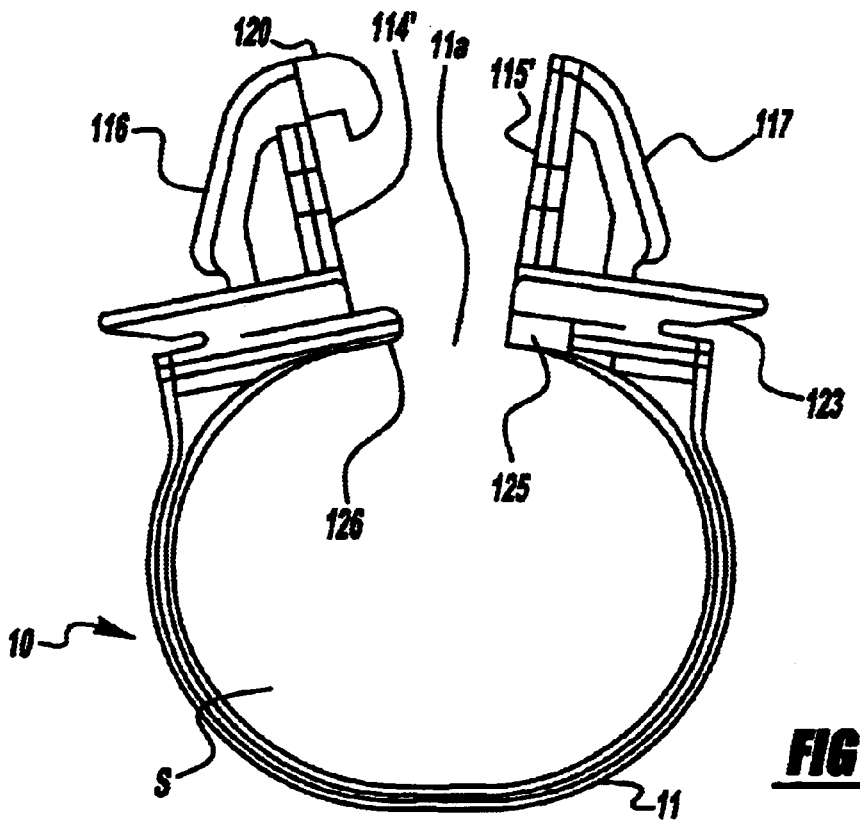

CLAMP

CROSS-REFERENCE TO RELATED APPLICATIONS

This application claims priority to Japanese Patent Application No. 2002-179046, filed Jun. 19, 2002, and Japanese Patent Application No. 2002-264685, filed Sep. 10, 2002, which applications are herein expressly incorporated by reference.

FIELD OF THE INVENTION

This invention relates to a clamp and, more particularly, to a clamp wound around a wire harness arranged in an automobile vehicle and locked in a through-hole in a car body panel.

BACKGROUND OF THE INVENTION

For convenience of explanation, a conventional clamp will be described below. FIGS. 30A through 30C are front elevation views of a conventional band type clamp. The figures illustrate operations to attach the clamp to the wire harness and lock the clamp on the car body panel. FIGS. 31A through 31C are front elevation views of a conventional base plate type clamp. These figures illustrate operations to attach the clamp to the wire harness and lock the clamp on the car body panel.

Heretofore, such a kind of clamp is broadly divided into a band type clamp shown in FIG. 30 and a base plate type clamp shown in FIG. 31.

A band type clamp 1 shown in FIG. 30 includes a box-like body 1a having a through-hole 1c. A band 1b extends from an end of the box-like body 1a. After the band 1b is wound around a wire harness W/H, the band 1b is inserted into the through-hole 1c in the box-like body 1a. A handgun type fastening-tool 6 clamps a latching piece 1d, provided in the through-hole 1c, so that the latching piece 1d engages one of the latching grooves 1e in the band 1b. Then, the band 1b fastens the wire harness W/H. A car body engagement section 1f stands up on an upper surface of the box-like body 1a.

A base plate type clamp 2 shown in FIG. 31 includes a base plate 2a, and a car body engagement section 2b that stands up on the base plate 2a. The base plate 2a is attached to the wire harness W/H by winding a tape T around the base plate 2a and the wire harness W/H.

The car body engagement sections 1f and 2b of the band type clamp 1 and base plate type clamp 2 include wing portions 1h and 2d bent down from distal ends of axle portions 1g and 2c. Stepped latching portions 1i and 2e are provided on distal ends of the wing portions 1h and 2d.

When the clamps 1 and 2 are locked on the car body, the wing portions 1h and 2d of the car body latching sections 1f and 2b are inserted into a through-hole 5a in a car body panel 5 while the wing portions 1h and 2d are narrowed. After inserting the wing portions 1h and 2d into the through-hole 5a, the wing portions 1h and 2d are widened to the original positions and the stepped latching portions 1i and 2e engage a periphery of the through-hole 5a in the car body panel 5.

In the band type clamp 1, after winding the band 1b around the wire harness W/H, the band 1b is inserted into the through-hole 1c in the box-like body 1a. The handgun type fastening-tool 6 clamps the band 1b to lock the band 1b in the body 1a. A cutter 7 cuts off an excessive end of the band 1b extending from the box-like body 1a. Accordingly, the band type clamp 1 requires the fastening tool 6 and cutter 7. Also, the steps of fastening the band 1b by using the tool 6 and cutting the band 1b by using the cutter 7 are necessary. The excessive end of the band 1b cut off by the cutter 7 is wasted. In the case where the wire harness W/H is a small size in diameter, a length of the band 1b to be cut off is increased. This will increase the waste of the band.

Furthermore, if a relative position between the clamp 1 and the through-hole 5a in the car body panel 5 is shifted, the clamp cannot be displaced with respect to the wire harness to correct the shifted position. This is due to the strength in which the band 1b fastens to the wire harness W/H. Consequently, a length of the wire harness W/H between the clamps 1 is set to be slightly longer than an allowable tolerance. This will increase the entire length of the wire harness and cause waste in the wire harness.

In the base plate type clamp 2, when the clamp 2 is attached to the wire harness W/H, the tape T is wound around the opposite ends of base plate 2a and the wire harness W/H. This requires tape and the step of winding the tape around the base plate and wire harness. Consequently, working steps are increased and different kinds of tapes must be prepared for the steps.

The attaching positions of the clamps 2 on the wire harness W/H are fixed, since the clamps 2 are attached to the wire harness by winding the tape T around the clamps and wire harness. In the event the relative position between the clamp 2 and the through-hole 5a in the car body panel 5 is shifted, as in the case with the band type clamp 1, the length of the wire harness must be longer than an allowable tolerance.

SUMMARY OF THE INVENTION

It is an object of the present invention is to provide a novel clamp that is different from the conventional band type clamp or base plate type clamp mentioned above. The novel clamp does not require any tape winding or band cutting steps. The novel clamp can be attached to the wire harness manually. The novel clamp can adjust an attaching position of the clamp on the wire harness. The novel clamp eliminates waste in the wire harness since the entire length of the wire harness may now be properly sized.

The present invention provides a clamp that is attached to a wire harness and inserted into and locked in a through-hole in a car body panel. The clamp comprises an arcuate annular strap section that enclose an interior space and defines an opening between opposite ends of the strap. A pair of insertion engagement sections are connected together with the opposite ends of the strap. The pair of insertion engagement sections oppose each other at opposite ends of the opening and stand outwardly. Each of the insertion engagement sections includes an axle plate portion projecting from an end of the opening. A wing portion is bent down from a distal end of the axle plate portion. A stepped latching portion is formed on a distal end of the wing portion. A dimension of the opening is set to be narrower than a diameter of the wire harness to be contained in the interior space. The annular strap section is elastically bent outwardly to widen the opening to receive and contain the wire harness in the interior space. After containment of the wire harness in the interior space, the annular strap section returns to its original position by an elastically recovery to narrow the opening thereby holding the wire harness in the interior space. The pair of insertion engagement sections are inserted into the through-hole in the car body panel. After insertion of the sections into the through-hole, the stepped latching portions engage a periphery of the through-hole, thereby locking the wire harness on a car body.

In the above clamp, when the wire harness is inserted into the opening enclosed by the annular strap section, the wire harness widens the opening and enters the interior space. A worker may widen the opening and then insert the wire harness into the interior space.

Since the annular strap section is formed into an arcuate configuration (C-shaped configuration), it is subject to an elastic recovery in a reduction direction in diameter. Even if an external force widens the opening, the annular strap section elastically returns to the original position when the external force is removed. Accordingly, since the annular strap section elastically returns to the original position to narrow the opening, the wire harness does not come out from the interior space enclosed by the annular strap section. It is possible to maintain the wire harness in the interior space enclosed by the annular strap section regardless of a diameter size of the wire harness, unless the wire harness is drawn out from the opening. Consequently, it is not necessary to prepare many clamps having various sizes in compliance with diameter sizes of the wire harnesses.

Further, even if the clamp is shifted slightly in the longitudinal direction from the through-hole in the car body panel, it is possible to easily displace the clamp on the wire harness to accord the clamp with the through-hole in the car body panel.

The insertion engagement sections for a car body are formed by dividing an insertion engagement section of a conventional band type clamp or a conventional base plate type clamp into half members. The half members stand on the opposite ends of the opening defined between the opposite ends of the annular strap section. These insertion engagement sections that are divided into two half members and stand on the opposite ends of the opening are spaced away from each other when the sections are widened upon insertion of the wire harness. However, after the opening returns to the original position, the insertion engagement sections approach each other. Further, when the insertion engagement sections are inserted into the through-hole in the car body panel, they are brought into contact with each other. The insertion engagement sections pass the through-hole while deflecting the wing portions. The wing portions return to the original position by an elastically recovery nature to widen a distance between them after passing the hole. The stepped latching portions of the wing portions engage the periphery of the through-hole to lock the clamp on the car body. Thus, even if the insertion engagement sections are divided half members that stand on the opposite ends of the opening of the annular strap section, they can be surely secured to the car body as in the case with the conventional band type or base plate type clamp.

Interlocking means are provided on the opposed surfaces of the axle plate portions of the pair of insertion engagement sections. Thus, the interlocking means are detachably coupled to each other. The opposed axle plate portions are coupled to each other to close the opening after inserting the wire harness into the interior space enclosed by the annular strap section.

The interlocking means are provided on the insertion engagement sections that stand on the opposite ends of the opening. After inserting the wire harness into the interior space enclosed by the annular strap section, the interlocking means are coupled to each other to close the opening. Accordingly, it is possible to prevent the wire harness from coming out of the interior space enclosed by the annular strap section. It is not necessary for a worker to bring the pair of insertion engagement sections into contact with each other when inserting them into the through-hole in the car body panel. This will enhance the workers efficiency.

A support plate is provided on each of the opposite ends of the opening. The support plates are arranged in lateral directions opposite from each other. An axle plate portion stands on the one half side of each support plate. An auxiliary axle plate portion stands on the other half side of the support plate. The auxiliary axle plate portion is connected to either lateral end of the axle plate portion. When the opposed axle plate portions are brought into contact with each other, the auxiliary axle plate portions are disposed on the opposite lateral sides of the axle plate portions.

The wide support plates are perpendicularly disposed to the right and left wing portions. The stepped latching portions of the wing portions engage the rear peripheral surface of the through-hole in the car body panel in the right and left directions. The support plates engage the front peripheral surface of the through-hole in the front and back directions. Thus, the insertion engagement sections is stably secured to the car body panel.

The support plate corresponds to a dish portion of a conventional clamp. A stopper rib may be provided on a distal end of the support plate so that the stepped latching portions on the lower ends of the wing portions are not outwardly displaced.

In the case of providing the auxiliary axle plate portions on the support plates, the inclined, stepped portion is provided on each of the opposed surfaces of the axle plate portions to form a thin thickness part toward the auxiliary axle plate portions. Inclining angles of the stepped portions are arranged in lateral directions opposite from each other. A latching protrusion is provided on a distal end of the stepped portion at a thick part side. A latching depression is provided on a distal end of the stepped portion at a thin part side and at a corner between the auxiliary axle plate portion and a curved portion. The insertion engagement sections are locked on each other when the latching protrusion is pushed into the latching depression.

Thus, it is possible to enhance a coupling force between the interlocking means by fitting the depressions and protrusions at two positions in the lateral direction and by reversing the latching protrusions and depressions at two positions.

In particular, it is possible to interlock the insertion engagement sections by forming round portions on the latching protrusions and depressions. The round protrusions are pushed into the round depressions over a half periphery.

Furthermore, the auxiliary axle plate portions may be provided on the opposite lateral sides of the axle plate portions as interlocking means of the divided insertion engagement sections. The one auxiliary axle plate portion is thick in the lateral direction while the other auxiliary axle plate portion is thin. The thin auxiliary axle plate portion is inserted into a gap between the other axle plate portion and the other wing portion.

Also, in order to facilitate or widen the annular strap section upon insertion of the wire harness, a depression is provided on a substantially central part of the annular strap section to oppose the opening. Opposite ends of the depression serve as support points when the annular strap section is bent outwardly. Alternatively, a thin hinge portion may be provided on a substantially central part of the annular strap section.

Thus, if the support points are provided on the annular strap section to be widened upon insertion of the wire harness, it is possible to reduce an inserting force of the wire harness. The support points can assist the annular strap section to return to the original position after inserting the wire harness.

A thin cantilever piece is provided on each of the opposite edges of the opening so that the cantilever pieces extend into the interior space enclosed by the annular strap section to close the opening. The wire harness is contained in the interior space enclosed by the annular strap section while widening the opening. The cantilever pieces return to their original position by elastic recovery after containing the wire harness in the interior space.

The one cantilever piece extending into the interior space is disposed on a front side in the lateral direction of the opening. The other cantilever piece is disposed on a rear side to prevent the cantilever pieces from interfering with each other.

Since the cantilever pieces close the opening at the inside of the interior space where interlocking means are absent on the insertion engagement sections, it is possible to prevent the wire harness from coming out from the opening.

However, the cantilever pieces may be provided when the interlocking means are provided on the insertion engagement sections. If the wire harness has a small diameter size and a clearance exists between the wire harness and the annular strap section in the interior space, the cantilever pieces can hold the wire harness with no play in the interior space.

The present invention in another aspect of the invention provides a clamp attached to a wire harness and inserted into and locked in a through-hole in a car body panel. The clamp comprises an arcuate annular strap section that encloses an interior space and defines an opening between opposite ends of the strap. A pair of outwardly standing insertion engagement sections are connected together with the opposite ends of the annular strap section to oppose each other at opposite ends of the opening. Each of the insertion engagement sections includes an axle plate portion projecting from an end of the opening. A wing portion is bent down from a distal end of the axle plate portion. A stepped latching portion is formed on a distal end of the wing portion. Reversed L-shaped locking portions, in cross section, project inwardly from at least one of the axle plate portions. Receiving portions, the upper parts of which are cut off, are provided on at least other of the axle plate portions. The wire harness is contained in the interior space enclosed by the annular strap section. The insertion engagement sections are interlocked by hooking the locking portions on the receiving portions to close the opening and hold the wire harness in the interior space. The interlocked insertion engagement sections are inserted into the through-hole in the car body panel. The stepped latching portions of the wing portions engage a periphery of the through-hole, thereby locking the wire harness on a car body.

The above construction does not require a conventional tape or tool. An attachment work of the clamp to the wire harness can be dramatically enhanced merely by hooking the locking portion on the receiving portion.

Since it is not necessary to cut off the annular strap section, the edge surface of the cut end does not effect an adjacent wire harness or a worker's hand. There is no waste of material.

The conventional clamp was secured to the wire harness completely by using a tape or tool. However, in the clamp of the present invention, the pair of insertion engagement sections are interlocked with the wire harness. The wire harness is contained in the interior space enclosed by the annular strap section. Under this condition, a plurality of clamps are attached to the wire harness at given length intervals. Accordingly, even if a pitch between the adjacent clamps does not accord with a pitch between the adjacent through-holes in the car body panel, it is possible to easily correct a position of the clamp on the wire harness by unlocking the insertion engagement sections.

A rib to prevent lateral shift extends inwardly from a lower end of the axle plate portion of at least one insertion engagement section. A depression opposes the rib on the axle plate portion of the at least other insertion engagement section. The insertion engagement sections are prevented from shifting in a lateral direction in parallel to contact surfaces of the sections when the rib is fitted in the depression.

When the locking portion is hooked on the receiving portion, the pair of insertion engagement sections are firmly interlocked in a direction perpendicular to the contact surfaces of the insertion engagement sections. When the rib is fitted in the depression, the insertion engagement sections can be prevented from shifting in a lateral direction in parallel to the contact surfaces.

BRIEF DESCRIPTION OF THE DRAWINGS

The foregoing and other features of the present invention will become apparent to one skilled in the art to which the present invention relates upon consideration of the invention with reference to the accompanying drawings, wherein:

FIGS. 7A, 7B, and 7C are front elevation views of the clamp and wire harness, illustrating an operation for attaching the clamp to the wire harness;

FIG. 28A is a perspective view of a sixth embodiment of a clamp in accordance with the present invention;

FIG. 28B is a front elevation view of the clamp shown in FIG. 28A;

DETAILED DESCRIPTION OF THE PREFERRED EMBODIMENTS

Embodiments of a clamp in accordance with the present invention will be described below.

FIGS. 1 through 9 show a first embodiment of a clamp in accordance with the present invention.

Figure 1:
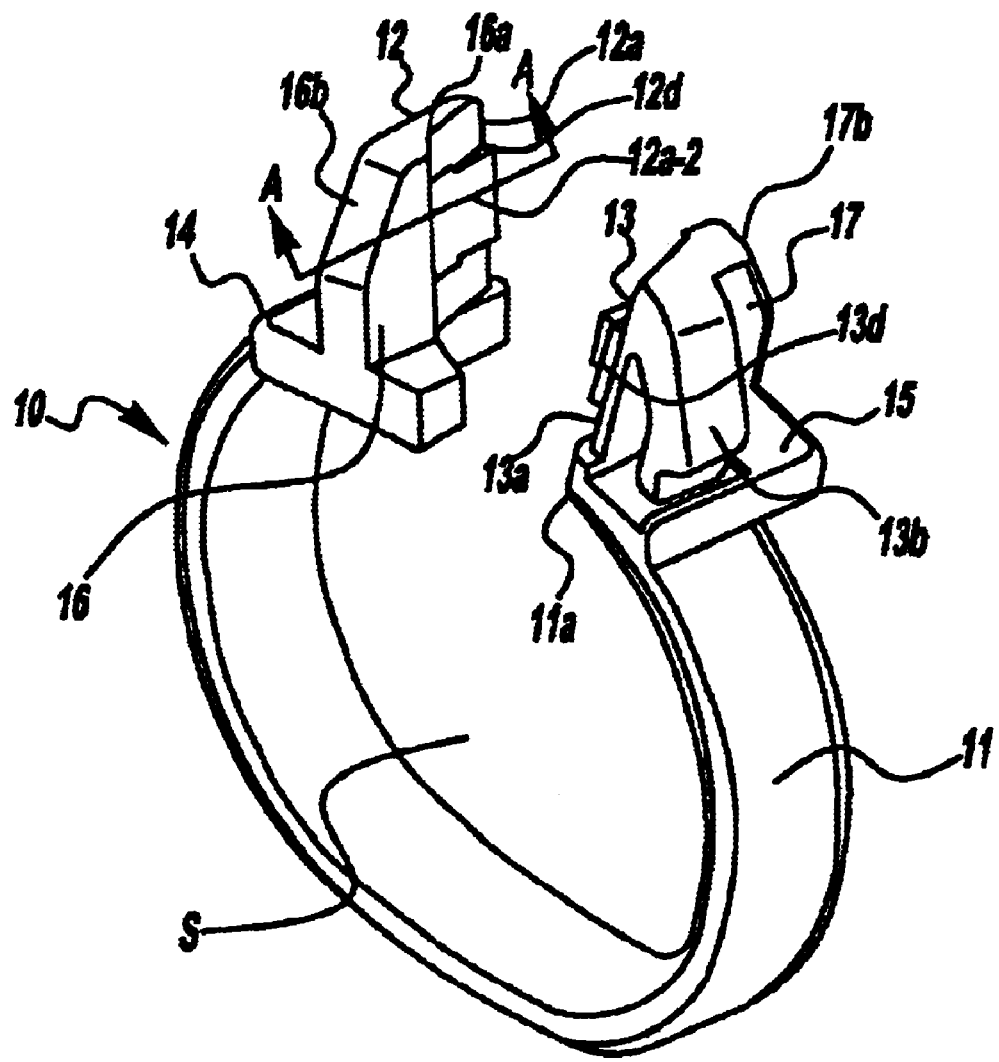
FIG. 1 is a perspective view of a first embodiment of a clamp in accordance with the present invention.

As shown in FIG. 1, a clamp 10 includes an arcuate annular strap section 11 having an opening 11a defined between the opposite ends of the strap 11. An interior space S is enclosed by the strap section 11. A pair of outwardly standing insertion engagement sections 12 and 13 oppose each other at opposite ends of the opening 11a. The annular strap sections 11 and insertion engagement sections 12 and 13 are integrally formed together of a resin material. The pair of insertion engagement sections 12 and 13 are formed into a configuration where the insertion engagement sections of the band type clamp and base plate type clamp mentioned above are divided into symmetrical half members.

Stepped thick support plates 14 and 15 are provided on the opposite ends of the opening 11a. One support plate 14 extends forwardly from a front end in the width (lateral) direction of the annular strap section 11. The other support plate 15 extends backwardly from a rear end in the width direction of the strap section 11. An axle plate portion 12a of the insertion engagement section 12 stands outwardly on the one support plate 14. An axle plate portion 13a of the insertion engagement section 13 stands outwardly on the other support plate 15.

Figure 2:
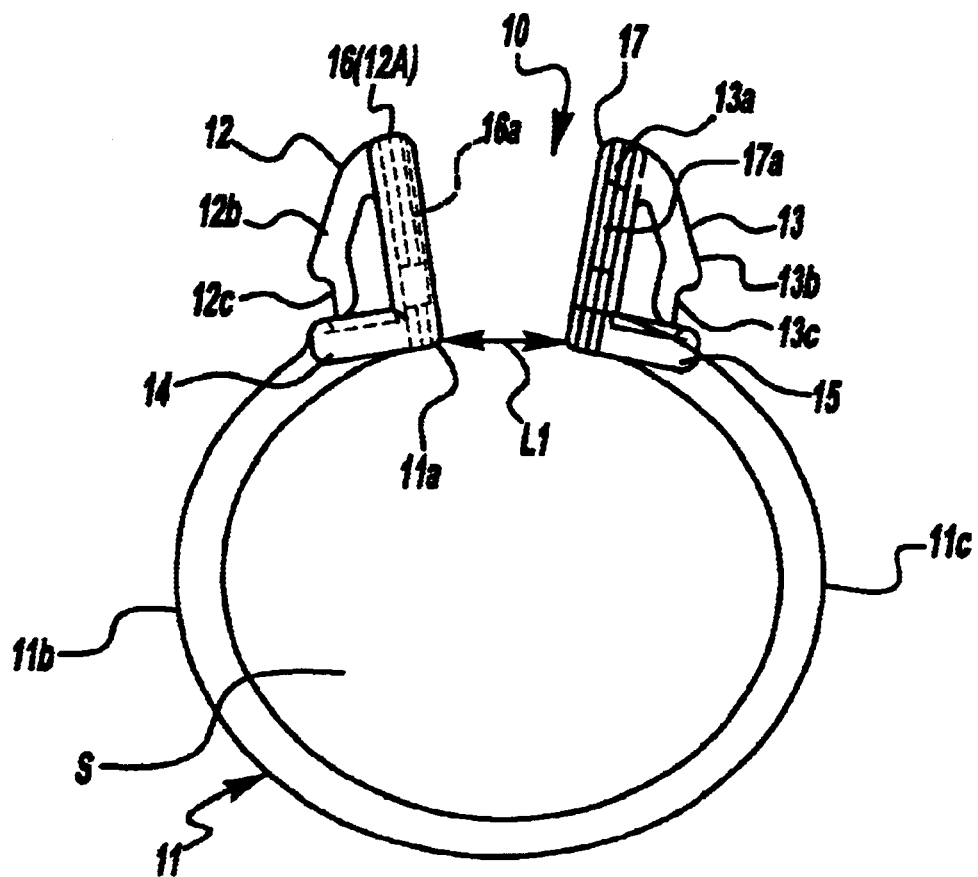
FIG. 2 is a front elevation view of the first embodiment of the clamp shown in FIG. 1.

As shown in FIG. 2, wing portions 12b and 13b of the axle plate portions 12a and 13a are bent down outwardly so that the wing portions 12b and 13b are spaced away from each other. Stepped latching portions 12c and 13c are provided on distal ends (lower ends) of the wing portions 12b and 13b.

Figure 3A:
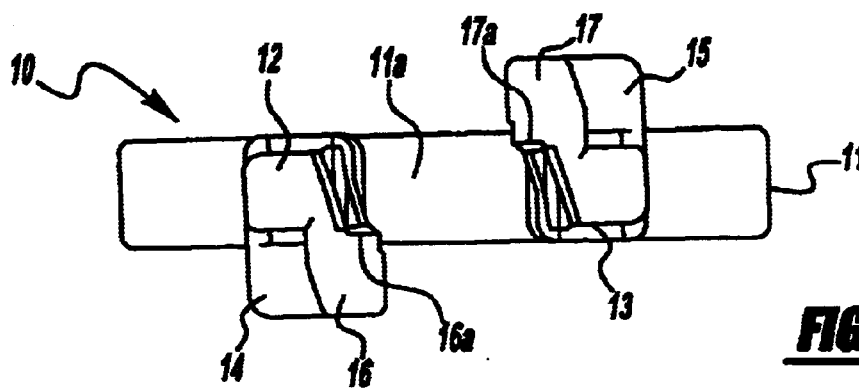
FIG. 3A is a plan view of the clamp shown in FIG. 2.
Figure 3B:
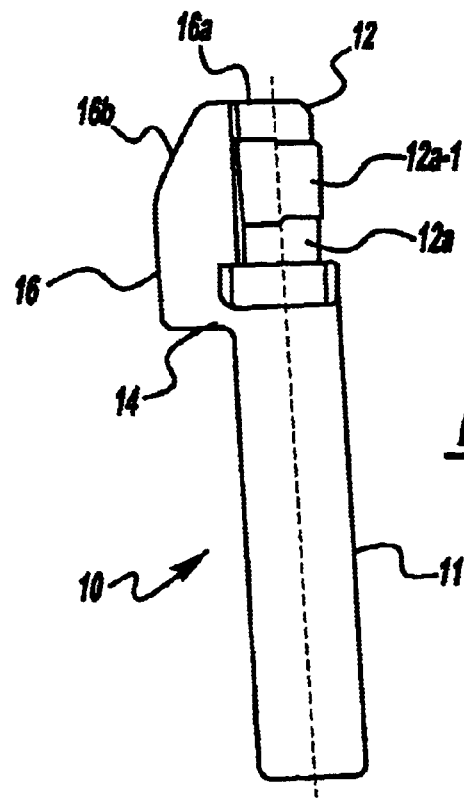
FIG. 3B is a side elevation view of the clamp shown in FIG. 2.
Figure 3C:
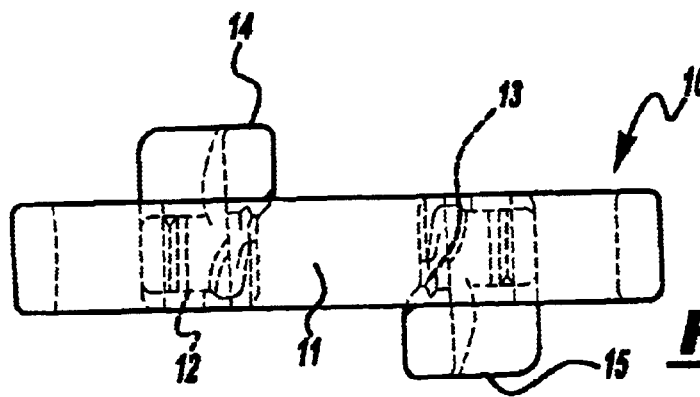
FIG. 3C is a bottom elevation view of the clamp shown in FIG. 2.

Auxiliary axle plate portions 16 and 17 (see FIG. 3(A)) stand on the support plates 14 and 15 and connect to lateral ends of the axle plate portions 12a and 13a. The auxiliary axle plate portions 16 and 17 are provided on ends with inclined surfaces 16b and 17b (see FIG. 1). Thus, the portions 16 and 17 can be easily inserted into the through-hole 5a in the car body panel 5. The auxiliary axle plate portions 16 and 17 are thick in thickness and are connected through curved portions 16a and 17a to the axle portions 12a and 13a.

The axle plate portions 12a and 13a gradually decrease their thickness away from the curved portions 16a and 17a with inclining upper and lower end surfaces. The axle plate portions 12a and 13a include, on the central parts of the opposed surfaces, stepped portions 12a-1 and 13a-1 that decrease their thickness and incline toward the auxiliary axle plate portions 16 and 17. The inclining angles of the stepped portions 12a-1 and 13a-1 are set to be in a reverse direction from each other. The stepped portions 12a-1 and 13a-1 have the same thickness at the positions connected to the auxiliary axle plate portions 16 and 17.

Figure 5:
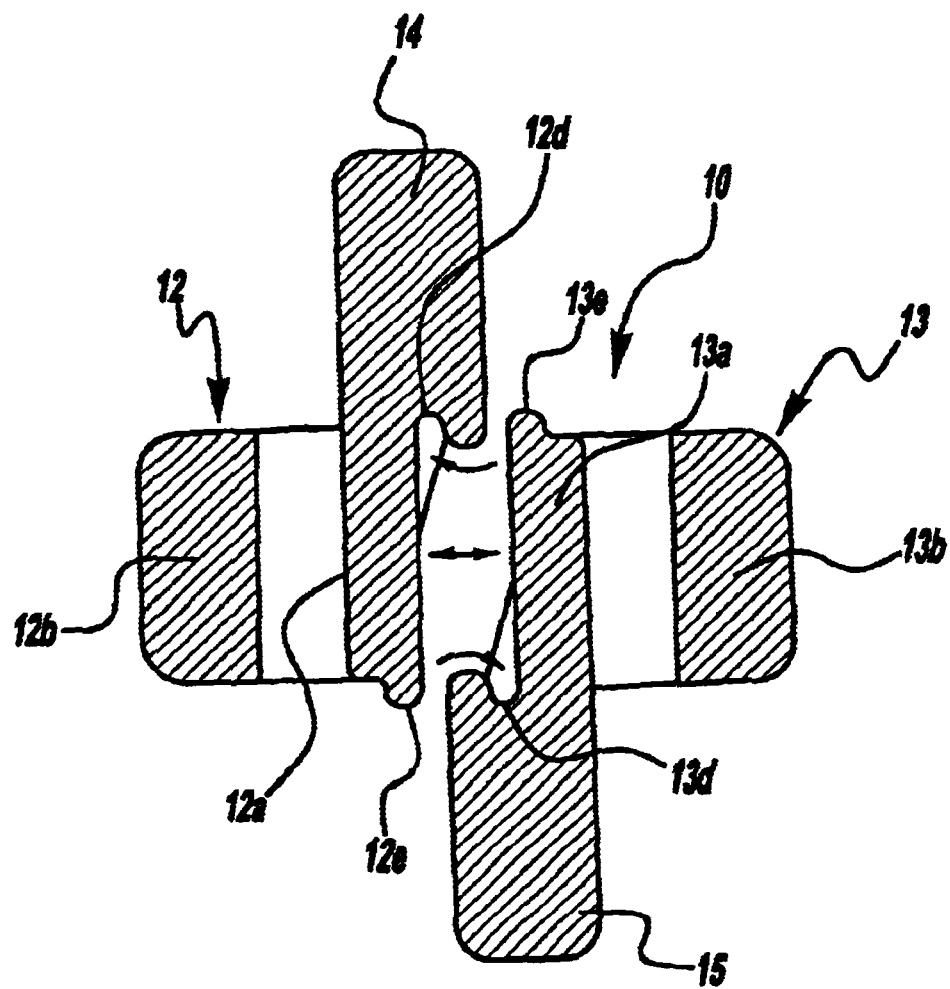
FIG. 5 is a cross sectional view of the clamp taken along line A—A in FIG. 1.

As shown in FIG. 5, the stepped portions 12a-1 and 13a-1 include, on their thick ends, rounded latching protrusions 12e and 13e. On their thin ends, the stepped portions 12a-1 and 13a-1 include latching valleys 12d and 13d. The latching protrusions 12e and 13e are locked in the latching valleys 12d and 13d when the latching protrusions 12e and 13e are pushed into corners of the curved portions 16a and 17a of the auxiliary plate portions 16 and 17.

Figure 4:
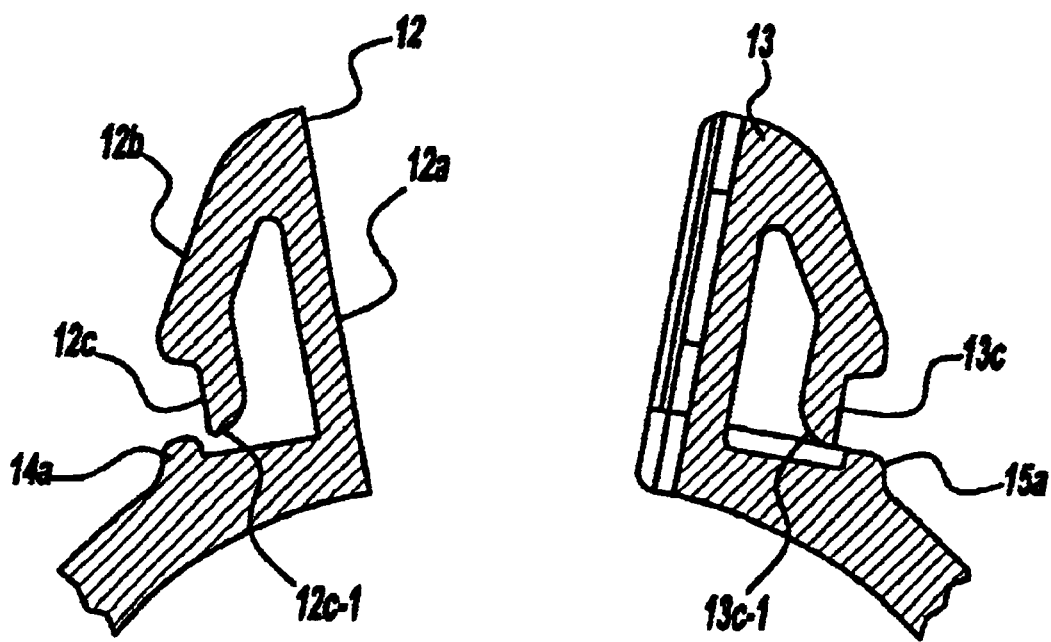
FIG. 4 is an enlarged sectional view of a main part of the clamp shown in FIG. 2.

Further, as shown in FIG. 4, stopper ribs 14a and 15a are provided on outer end edges of the support plates 14 and 15. When lower ends 12c-1 and 13c-1 of the stepped latching portions 12c and 13c are displaced outwardly, the lower ends 12c-1 and 13c-1 come into contact with the stopper ribs 14a and 15a to prevent the portions 12c and 13c from being further outwardly displaced.

A dimension L1 (FIG. 2) of the opening 11a in the annular strap section 11 is set to be smaller than a diameter L2 (FIG. 7) of the wire harness W/H to be contained within the interior space S enclosed by the annular strap section 11. However, when the annular strap section 11 is bent outwardly to widen the opening 11a, the wire harness W/H is maintained in the interior space S. Since the annular strap section 11 is formed into an arcuate configuration, when the external force is removed after widening, an elastic recovery occurs in the annular strap section 11 in a direction to reduce the arcuate configuration to return the opening 11a to the original dimension L1.

Next, an operation to attach the clamp 10 to the wire harness W/H and locking the clamp 10 in the through-hole 5a in the car body panel 5 will be described below.

Figure 6:
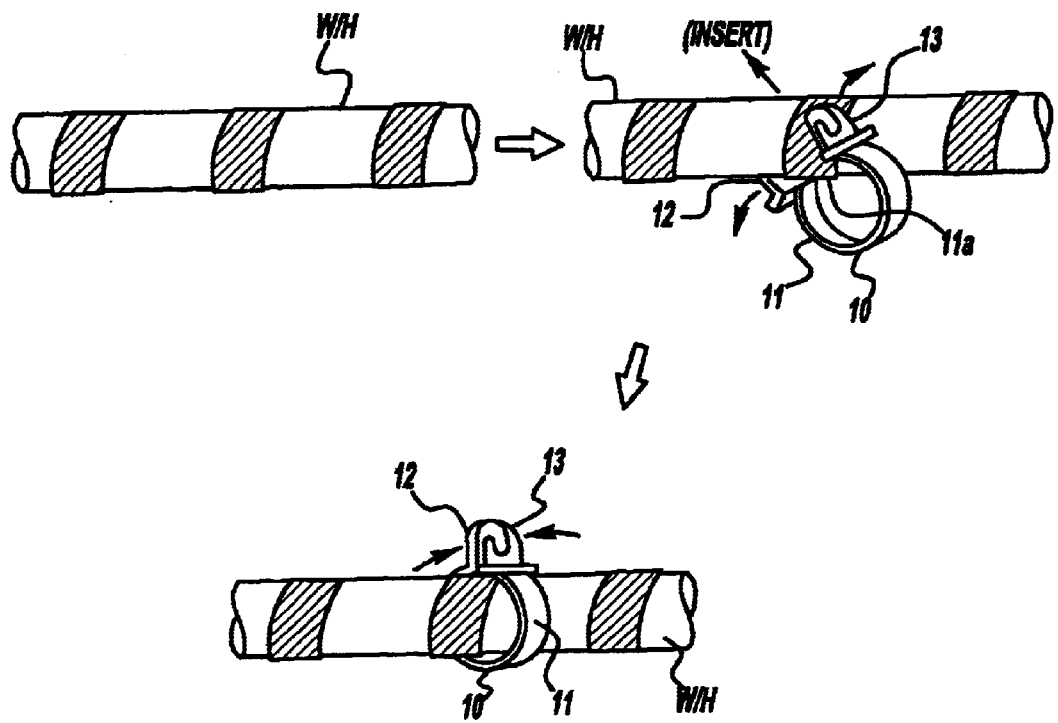
FIG. 6 is a schematic perspective view of a wire harness, illustrating an operation for attaching the clamp to the wire harness.

FIGS. 6 and 7 show conditions in which the clamp 10 is attached to the wire harness W/H.

As shown in FIG. 6 and FIG. 7A, the clamp 10 is attached laterally to the wire harness W/H at a desired position. In more detail, as shown in FIG. 7A, the wire harness W/H is pushed into the interior space S enclosed by the annular strap section 11 through an upper part of the opening 11a. Since the dimension L1 of the opening 11a is smaller than the diameter L2 of the wire harness W/H, the opening 11a is widened by an inserting force of the wire harness W/H. The right and left arms 11c and 11b of the annular strap section 11 are elastically bent outwardly.

A worker may carry out an auxiliary work for widening the opening 11a upon insertion of the wire harness.

When the wire harness W/H passes the opening 11a, as shown in FIG. 7B, the wire harness W/H is contained in the interior space S. The annular strap section 11 returns to its original position due to its elastic recovery nature. The opening 11a returns to the original dimension L1. Under this condition, the wire harness W/H is held in the interior space S enclosed by the annular strap section 11 unless any external force draws out the wire harness W/H from the opening 11a. Thus, the clamp 10 can be attached to the wire harness W/H at the touch merely by pushing the wire harness W/H into the opening 11a.

However, in order to prevent the wire harness W/H from coming out from the interior space S, as shown in FIG. 7C, the insertion engagement sections 12 and 13, which project from the opposite ends of the opening 11a, are locked on each other to close the opening 11a.

The axle plate portions 12a and 13a are interconnected by bringing the central stepped portion 12a-1 into contact with the central stepped portion 13a-1. The latching protrusion 12e is pushed into the latching depression 13d. The round protrusion 13e is pushed into the latching depression 12d at the opposite lateral end. Thus, the insertion engagement sections 12 and 13 are locked on each other. Under this condition, the locked axle plate portions 12a and 13a are clamped between the thick auxiliary axle plate portions 16 and 17 to surely maintain a coupling state between the latching protrusion and the latching depression.

Figure 8A:
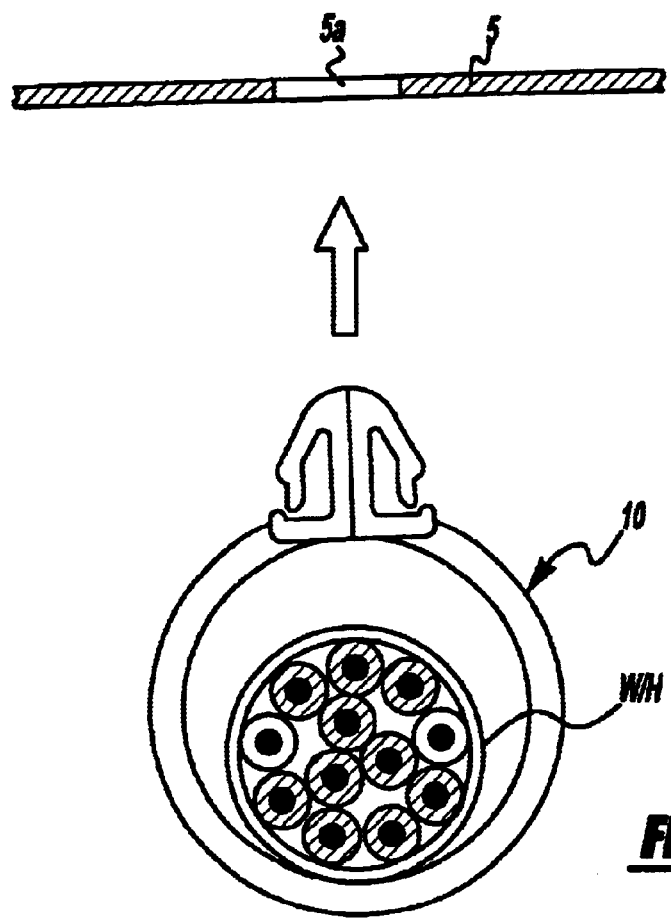
FIGS. 8A and 8B are front elevation views of the clamp, illustrating an operation for securing the clamp in a through-hole in a car body panel.
Figure 8B:
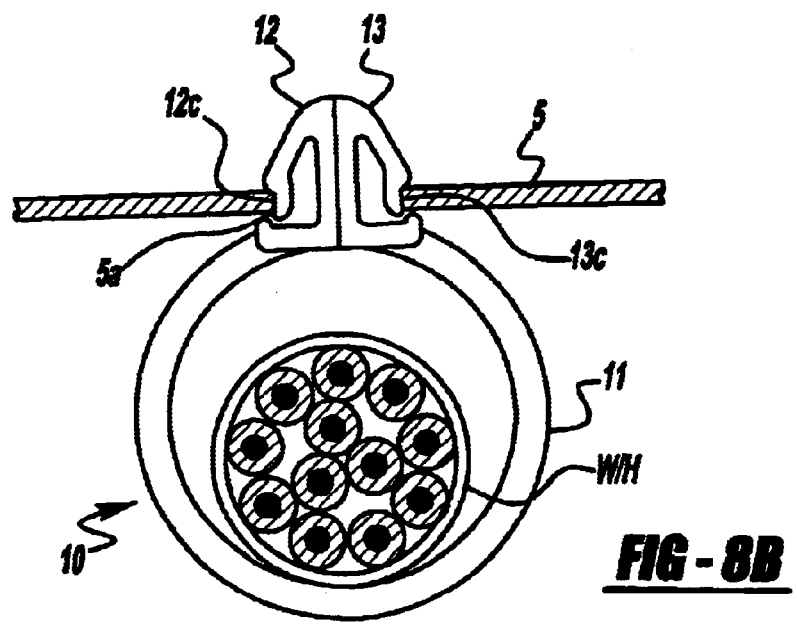

When the wire harness W/H and clamp 10 are arranged in a vehicle, as shown in FIGS. 8A and 8B, the insertion engagement sections 12 and 13 are inserted into and locked in the through-hole 5a in the car body panel 5.

The interconnected insertion engagement sections 12 and 13 are inserted together into the through-hole 5a. When the wing portions 12b and 13b of the opposite sides of the insertion engagement sections 12 and 13 pass the through-hole 5a, the wing portions 12b and 13b are elastically bent inwardly in the through-hole 5a. After passing, the wing portions 12b and 13b return to their original position to widen the distance between the wings. Consequently, the stepped latching portions 12c and 13c engage the periphery of the through-hole 5a at the lower ends of the wing portions 12b and 13b.

Figure 9:
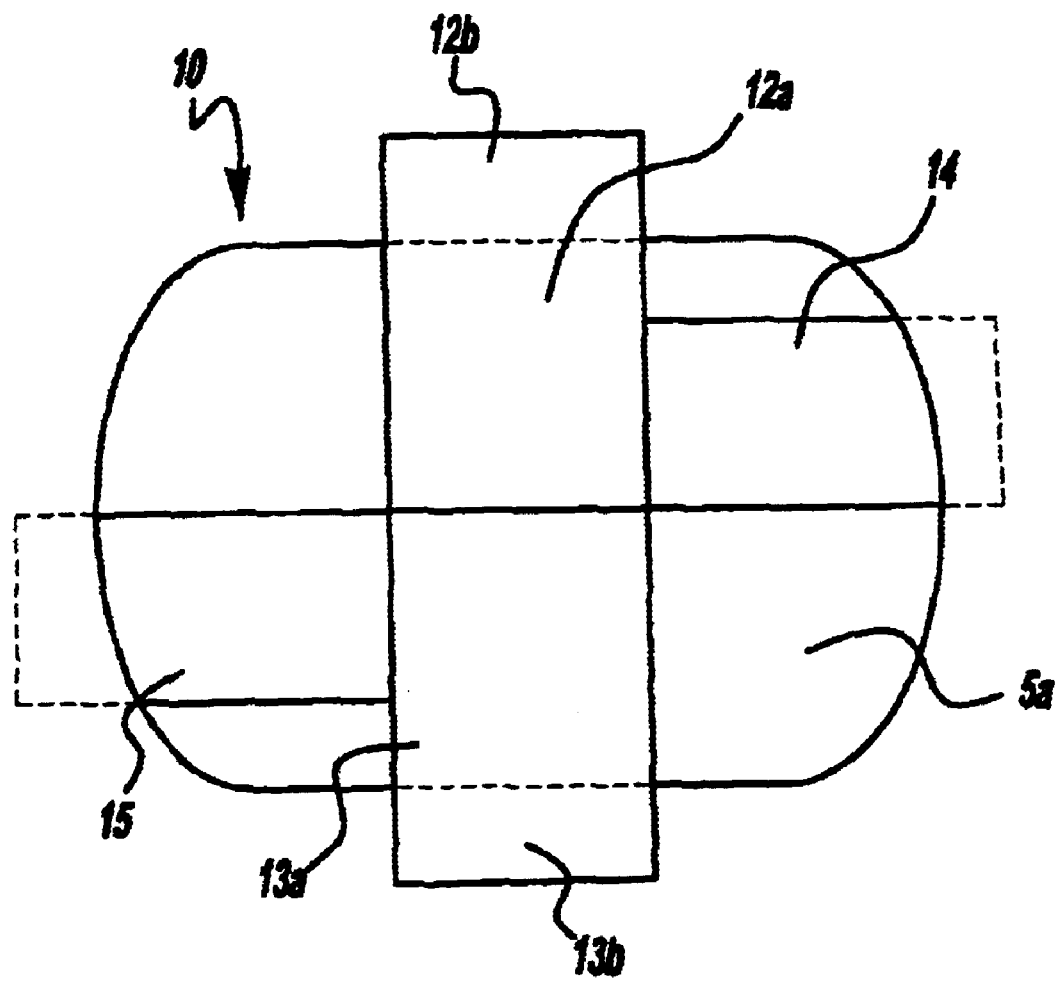
FIG. 9 is a schematic plan view of the clamp, illustrating an engagement position between the clamp and the through-hole in car body panel.

The through-hole 5a is formed into an ellipse-like shape, as shown in FIG. 9. The stepped latching portions 12c and 13c engage the rear side periphery near a short axis of the ellipse-like shape. On the other hand, the support plates 14 and 15 engage the front side periphery near a long axis of the ellipse-like shape. Thus, the car body panel 5 is clamped between the stepped latching portions 12c, 13c and the support plates 14, 15 at four positions in a cruciform pattern around the ellipse-like opening 5a, thereby firmly securing the clamp 10 to the car body panel 5.

Furthermore, it is possible to move the clamp 10 on the wire harness W/H to accord with the through-hole 5a, since the annular strap section 11 is not fixed to the wire harness W/H and the clamp 10 can move on the wire harness W/H. Also, the clamp 10 is shifted from the through-hole 5a in the car body panel 5.

Accordingly, it is not necessary to set the length of the wire harness W/H, between the clamps 10, longer than an allowable tolerance. It is also possible to eliminate wire harness waste by shortening the excessive length over the entire length of the wire harness.

Figure 10A:
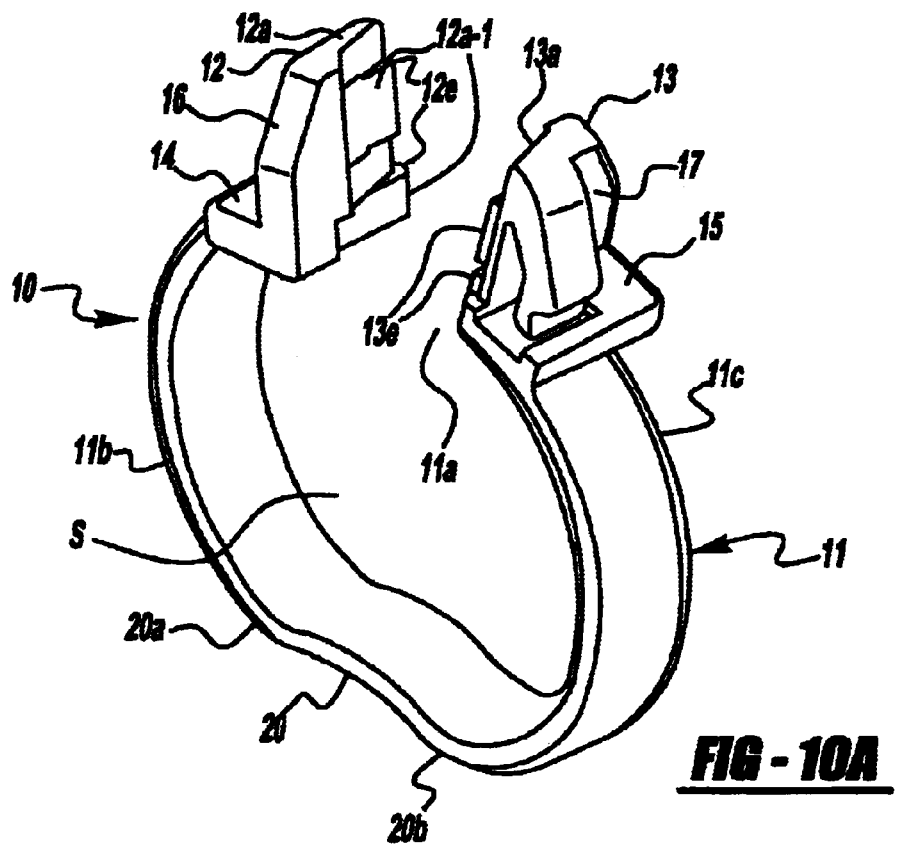
FIGS. 10A and 10B are a perspective view and a front elevation view of a first alteration of the first embodiment of the clamp in accordance with the present invention.
Figure 10B:
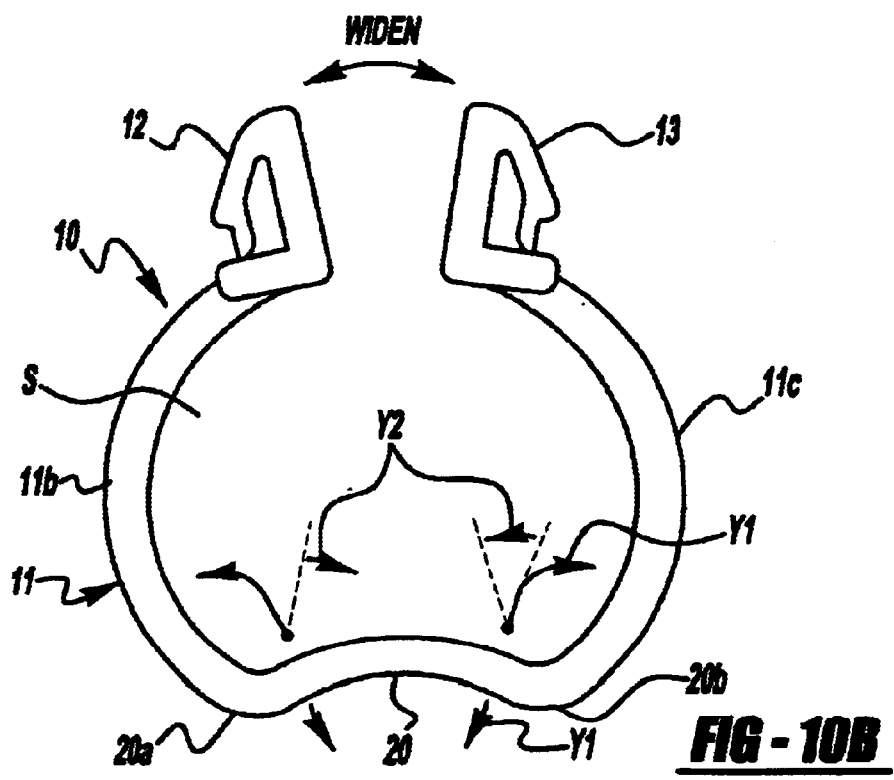

FIGS. 10A and 10B show a first alteration of the first embodiment of the clamp in accordance with the present invention.

In the first alteration, the annular strap section 11 opposing the opening 11a includes a depression 20 projecting inwardly toward the interior space S.

The right and left ends 20b and 20a of the depression 20 serve as support points when the right and left arms 11c and 11b of the annular strap section 11 are bent outwardly upon insertion of the wire harness W/H. The right and left ends 20b and 20a are deflected in the directions shown by arrows Y1 by means of the depression 20. Thus, the right and left arms 11c and 11b can be readily bent outwardly. Also, after inserting the wire harness W/H into the interior space S, the right and left ends 20b and 20a serve as support points when the depression 20 elastically returns to its original position in the directions shown by arrows Y2.

Further, the projecting depression 20 comes into contact with the wire harness W/H. Thus, the wire harness W/H is contained in the interior space S without causing any play.

In order to enhance a locking action between the divided insertion engagement sections 12 and 13, the axle plate portions 12a and 13b are provide on central and lower end positions with stepped portions 12a-1, 12a-2 and 13a-1, 13a-2. Latching protrusions 12e and 13e and latching depressions (not shown) are provided on the respective opposite ends in the width direction of the stepped positions. The engagement of the protrusions and depressions at four positions will enhance the locking action of the insertion engagement sections.

Figure 11:
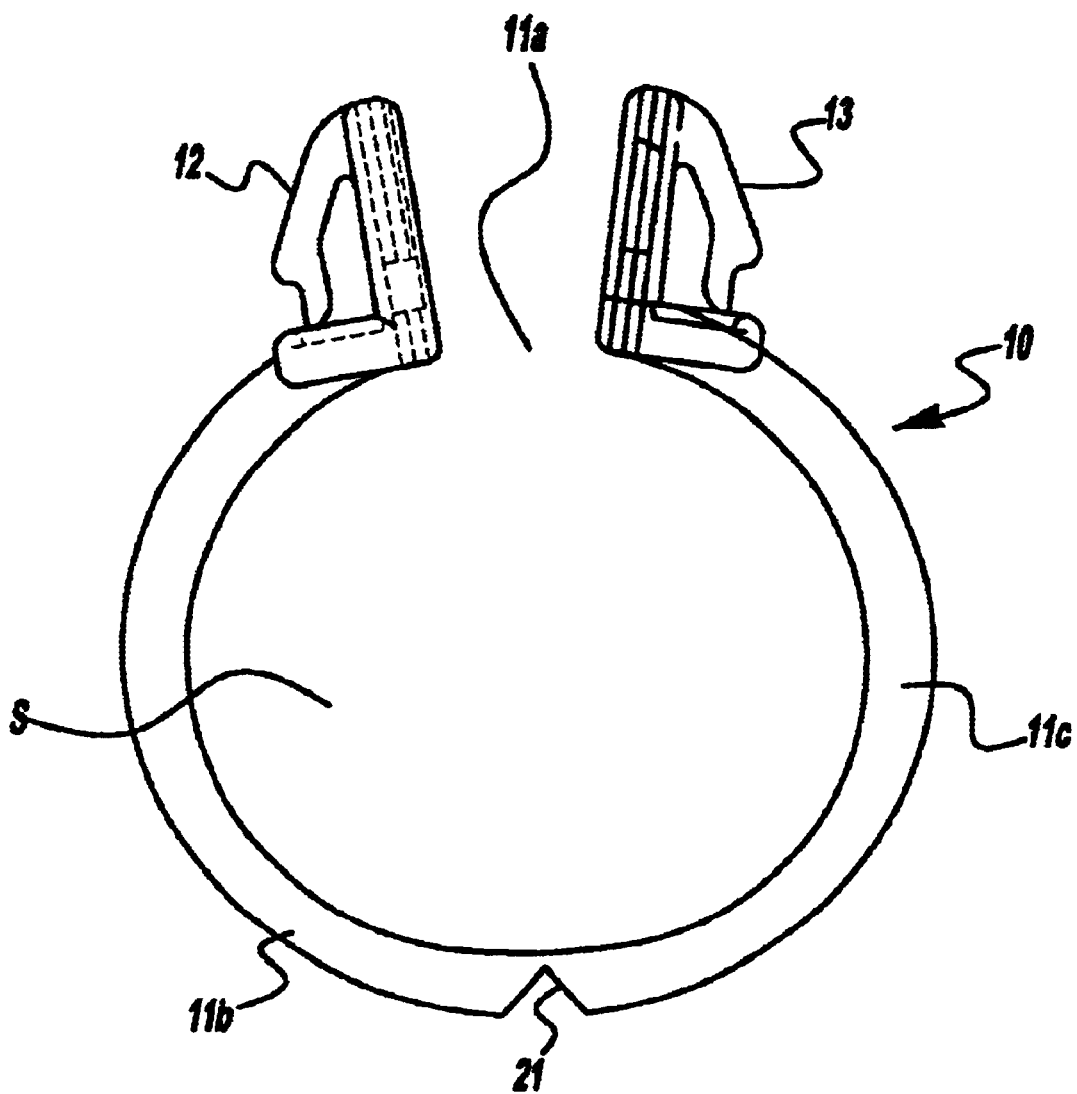
FIG. 11 is a front elevation view of a second alteration of the first embodiment of the clamp in accordance with the present invention.

FIG. 11 shows a second alteration of the first embodiment of the clamp in accordance with the present invention. In the second alteration, a V-shaped notch is provided in the central part of the outer surface of the annular strap section 11, in lieu of the depression 20, to form a thin hinge portion 21. The thin hinge portion 21, as in the case with the depression 20, serves as a support point when the right and left arms 11c and 11b are bent outwardly upon insertion of the wire harness W/H into the interior space S enclosed by the annular strap section 11. The thin hinge portion 21 makes it easy to widen the opening 11a defined between the opposite ends of the annular strap section 11.

Figure 12A:
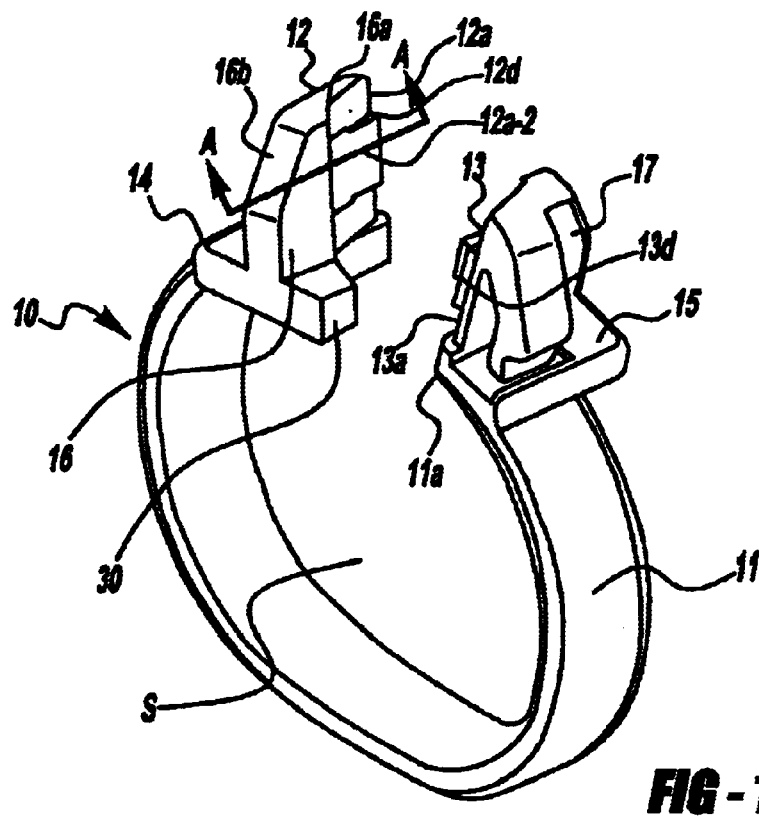
FIG. 12A is a perspective view of a third alteration of the first embodiment of the clamp in accordance with the present invention.
Figure 12B:
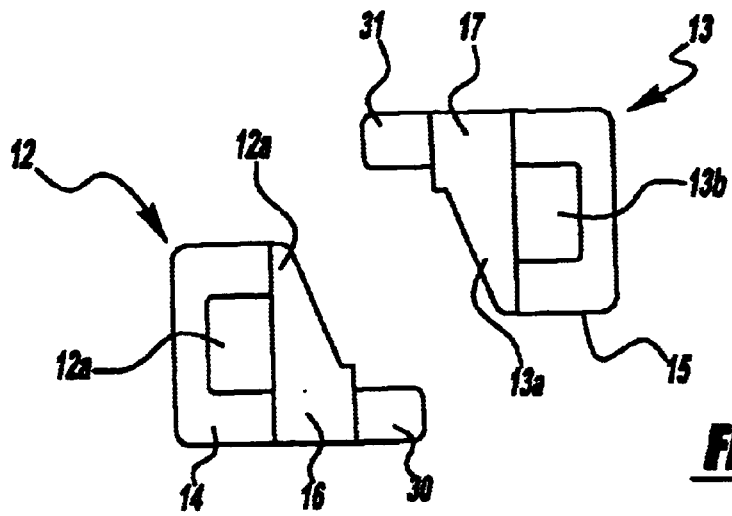
FIG. 12B is a plan view of divided insertion engagement sections of FIG. 12A.

FIGS. 12A and 12B show a third alteration of the first embodiment of the clamp in accordance with the present invention. In the third alteration, guide ribs 30 and 31 are provided on the surfaces on which the auxiliary axle plate portions 16 and 17 of the support plates 14 and 15 stand.

When the divided insertion engagement sections 12 and 13 are coupled to each other, the guide rib 30 guides the mating axle plate portion 13a while the guide rib 31 guides the mating axle plate portion 12a. Thus, the guide ribs 30 and 31 make it easy to couple the insertion engagement sections 12 and 13 to each other.

Figure 13:
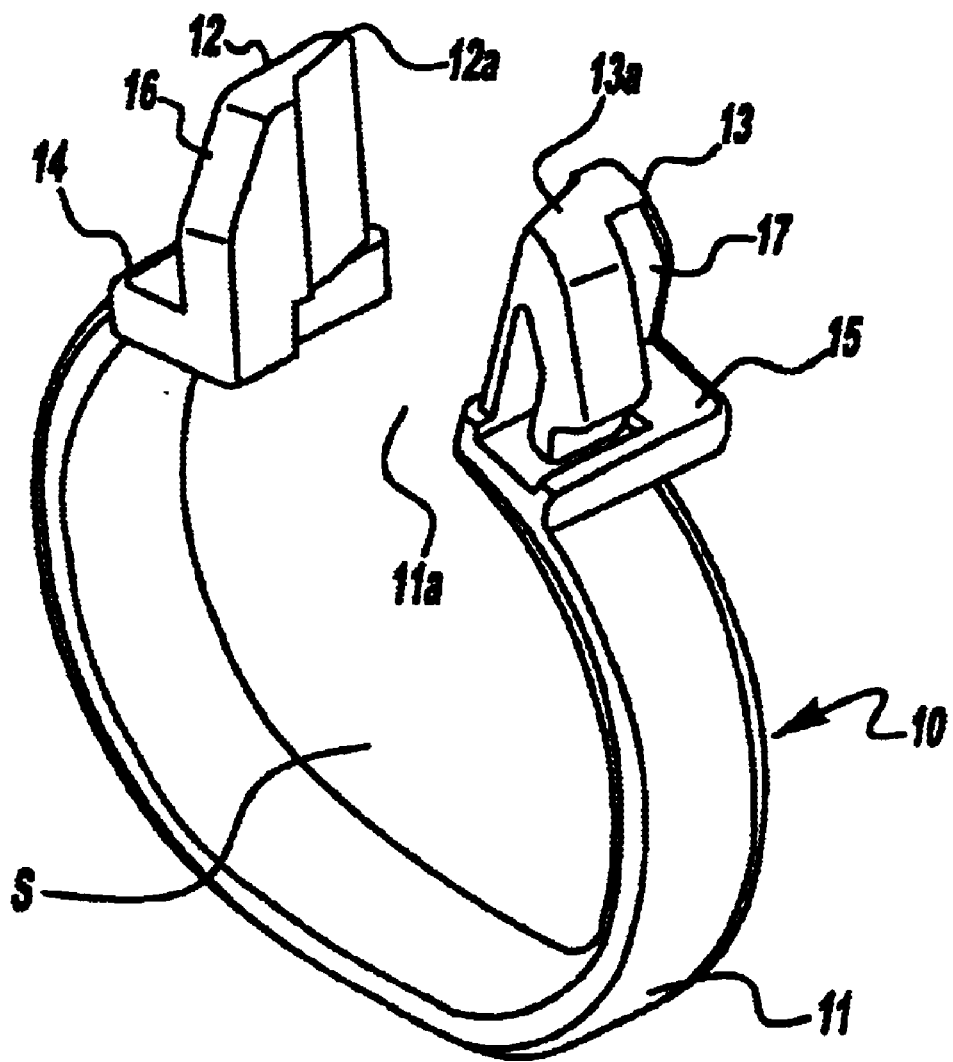
FIG. 13 is a perspective view of a second embodiment of the clamp in accordance with the present invention.

FIG. 13 shows a second embodiment of the clamp in accordance with the present invention.

In the second embodiment, the axle plate portions 12a and 13a of the insertion engagement sections 12 and 13 do not include interlocking means. After containing the wire harness W/H in the interior space S, enclosed by the annular strap section 11, the insertion engagement sections 12 and 13 are coupled to each other to close the opening 11a.

As described above, even if the axle plate portions 12a and 13a are not locked, it is possible to maintain the wire harness W/H in the interior space S enclosed by the annular strap section 11. If the dimension of the opening 11a of the annular strap section 11 is smaller than the diameter of the wire harness W/H and if any external force does not draw out the wire harness from the opening before attaching the clamp to the car body panel, the wire harness W/H can be held in the interior space S.

Before the insertion engagement sections 12 and 13 are inserted into the through-hole 5a in the car body panel 5, the sections 12 and 13 are not coupled to each other. When the sections 12 and 13 are inserted into the through-hole 5a, the inclined surfaces of the wing portions 12b and 13b come into contact with the inner wall of the through-hole 5a and are elastically bent inwardly. After the wing portions 12b and 13b pass the through-hole 5a, they return to their original positions by elastic recovery. Then, the stepped latching portions 12c and 13c engage the periphery of the through-hole 5a to secure the clamp 10 to the car body. Accordingly, even if the insertion engagement sections 12 and 13 are not locked on each other, it is possible to proceed to insert the sections 12, 13 into the car body.

Figure 14:
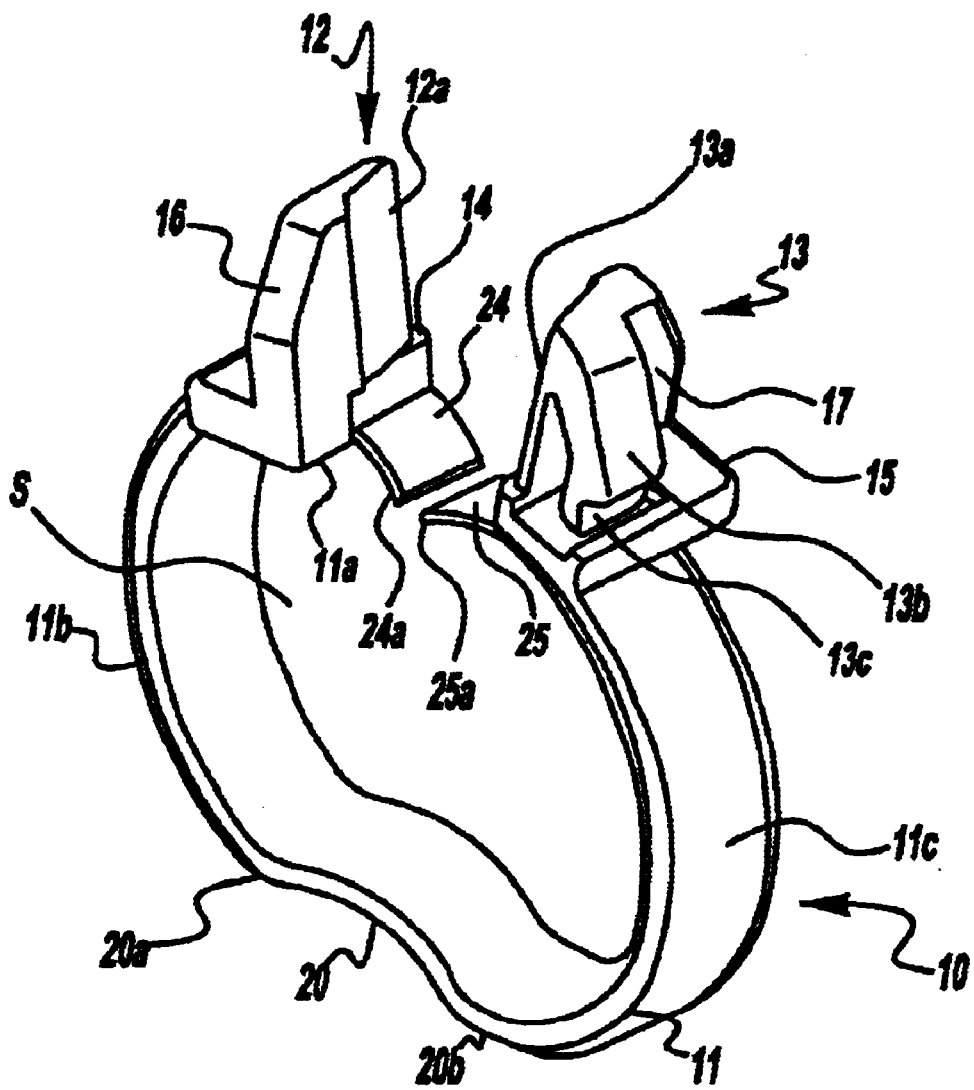
FIG. 14 is a perspective view of a third embodiment of the clamp in accordance with the present invention.

FIGS. 14 and 15 show a third embodiment of the clamp in accordance with the present invention. In the third embodiment, the axle plate portions 12a and 13a are not locked on each other to close the opening 11a. Thin cantilever pieces 24 and 25 are provided on opposite edges of the opening 11a. Thus, the pieces 24 and 25 extend into the interior space S enclosed by the annular strap sections 11 to close the opening 11a. The cantilever pieces 24 and 25 are shifted laterally so that one cantilever piece 24 is disposed on a front side in the lateral direction of the opening 11a. The other cantilever piece 25 is disposed on a rear side in the lateral direction of the opening 11a. This avoids an interference with distal ends of the cantilever pieces 24 and 25. The distal ends of the cantilever pieces 24 and 25 are formed into a round shape. Thus, the distal ends do not break the wire harness W/H when they come into contact with the wire harness. In the third embodiment, the depression 20 is provided on the bottom side of the annular strap section 11.

Figure 15A:
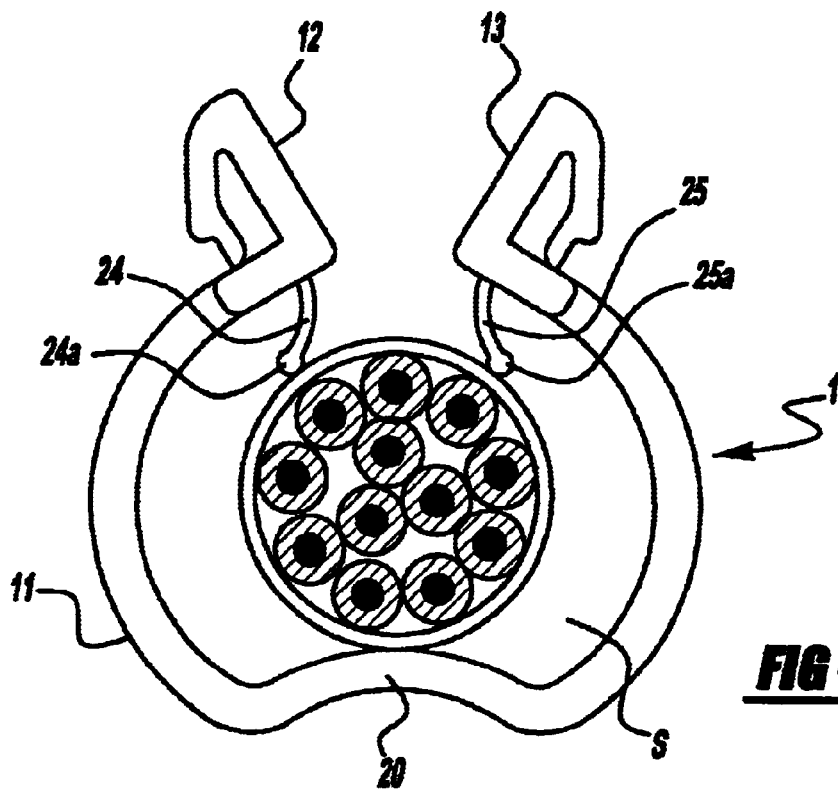
FIGS. 15A and 15B are front elevation views of the clamp in the third embodiment, illustrating an operation for attaching the clamp to the wire harness.

As shown in FIG. 15A, when the wire harness W/H is inserted into the space S enclosed by the annular strap section 11 while widening the opening 11a, the wire harness W/H pushes down and spaces the cantilever pieces 24 and 25 away from each other. After the wire harness W/H is contained in the interior space S, as shown in FIG. 15(B), the cantilever pieces 24 and 25 return to their original positions, via elastic recovery, to close the opening 11a.

Figure 15B:
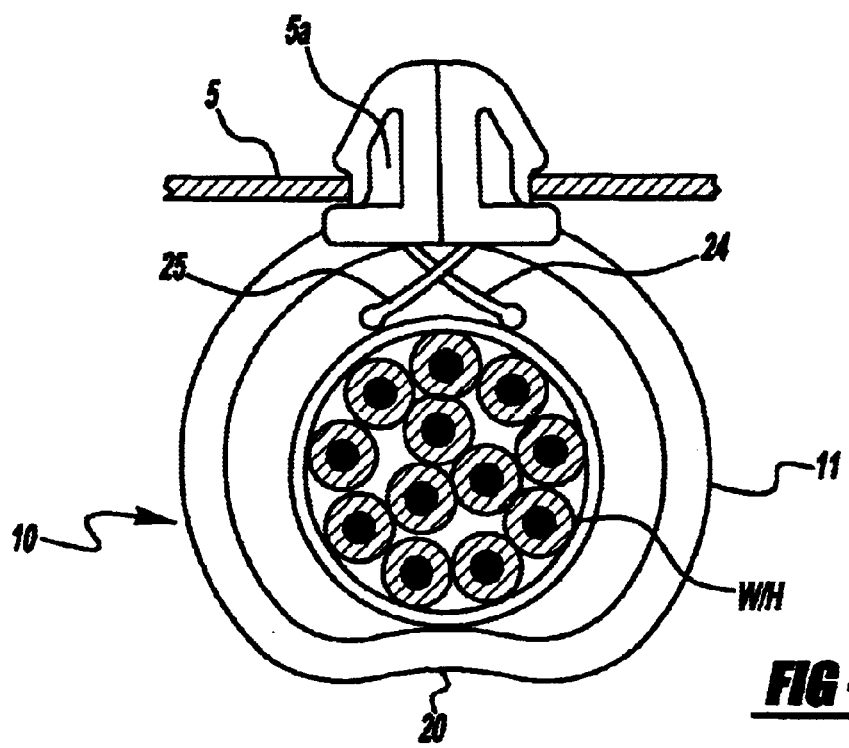

Even if any external force is applied to the wire harness W/H to withdraw the wire harness from the clamp 10, as shown in FIG. 15B, the cantilever pieces 24 and 25 are deflected to the opening 11a together with the wire harness W/H. At this time, since the deflected cantilever pieces 24 and 25 close the opening 11a, it is possible to surely prevent the wire harness W/H from being withdrawn from the clamp 10.

Also, the cantilever pieces 24 and 25 push down the wire harness W/H into the interior space S onto the inner surface of the annular strap section 11. This contains the wire harness in the interior space S without causing any play.

Figure 16:
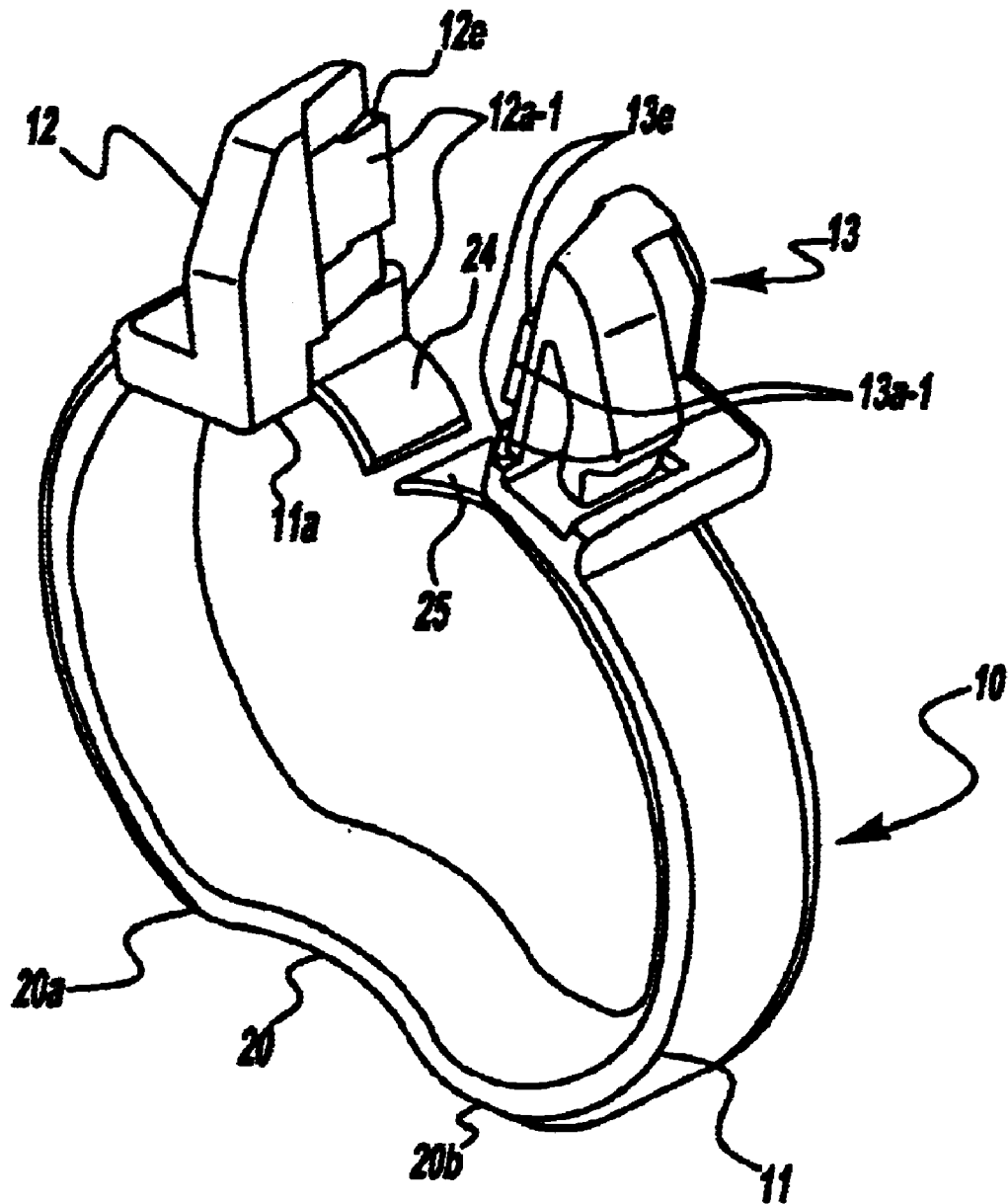
FIG. 16 is a perspective view of an alteration of the third embodiment of the clamp in accordance with the present invention.

FIG. 16 shows an alteration of the third embodiment of the clamp in accordance with the present invention. In the alteration, stepped portions 12a-1 an 13a-1 are provided on the axle plate portions 12a and 13a. Latching protrusion and depression which lock onto each other are provided on the portions 12a and 13a in a lateral direction.

Figure 17A:
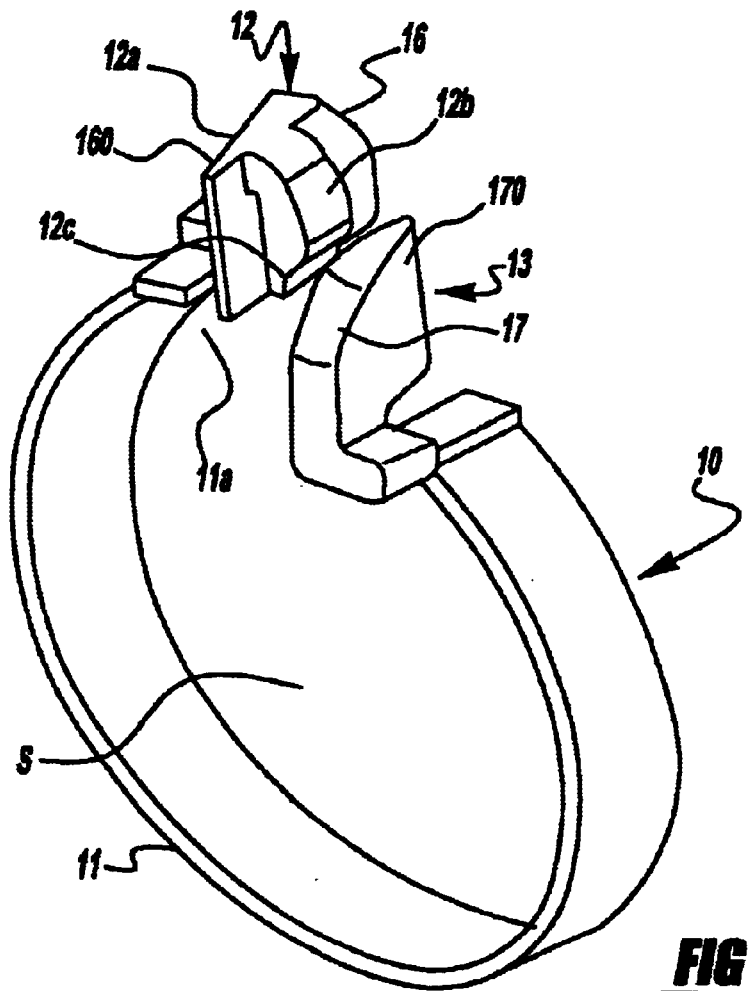
FIGS. 17A and 17B are a perspective view and a plan view of a fourth embodiment of the clamp in accordance with the present invention, FIG. 17B illustrating an operation for locking insertion engagement sections on each other.
Figure 17B:
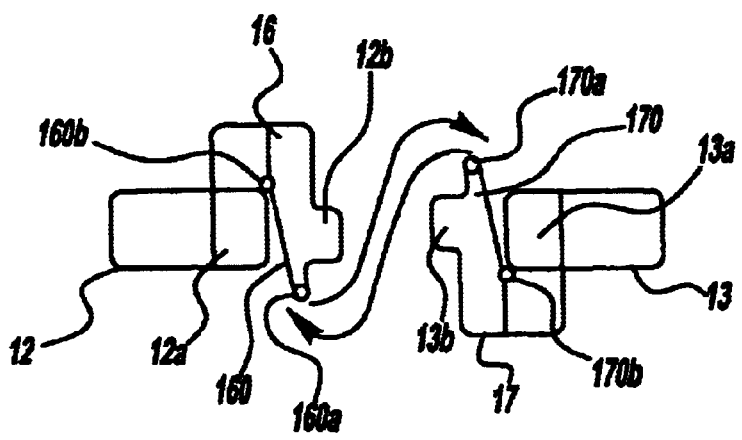

FIGS. 17A and 17B show a fourth embodiment of the clamp in accordance with the present invention. In the fourth embodiment, locking shapes of the axle plate portions are different from those in the first embodiment.

Wing portions 12b and 13b are provided on the axle plate portions 12a and 13a so that the wing portions extend in opposite directions to those in the first embodiment. Auxiliary axle plate portions 16, 160 and 17, 170 are provided on the opposite ends of the axle plate portions 12a and 13a in the lateral direction. The auxiliary axle plate portions are arranged reversely in the lateral directions. The auxiliary axle plate portions 160 and 170 are thick in thickness while the auxiliary axle plate portions 16 and 17 are thin in thickness.

As shown in FIG. 17B, the thin auxiliary axle plate portions 160 and 170 are inserted between the mating axle plate portion 12a and the mating wing portion 12b and between the mating axle plate portion 13a and the mating wing portion 13b. The wing portion 12b of the left insertion engagement section 12 is disposed on the right side while the wing portion 13b of the right insertion engagement section 13 is disposed on the left side. Consequently, the insertion engagement sections 12 and 13 are locked on each other in a torsion-fitting manner.

As shown in FIG. 17B, the auxiliary axle plate portions 160 and 170 are provided on their distal ends with latching protrusions 160a and 170a while latching depressions 160b and 170b are provided between the auxiliary axle plate portion 16 and the axle plate portion 12. The latching protrusion 160a is pushed into the latching depression 170b and the latching protrusion 170a is pushed into the latching depression 160b to lock the insertion engagement sections 12 and 13 on each other. As described above, a locking mechanism of the divided insertion engagement sections may adopt any suitable shape.

FIGS. 18 through 22 show a fifth embodiment of a clamp 10 in accordance with the present invention.

Figure 18:
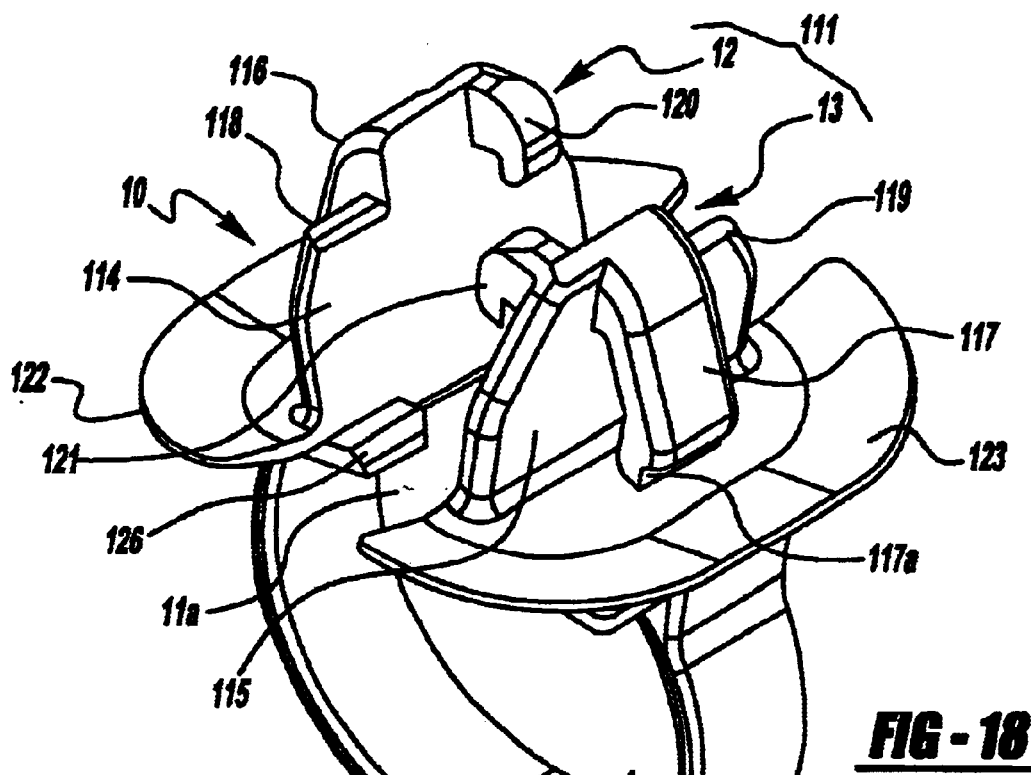
FIG. 18 is a perspective view of a fifth embodiment of a clamp in accordance with the present invention.

The clamp 10 is made of a synthetic resin material. The clamp 10, as shown in FIG. 18, includes a C-shaped annular strap section 11 defining an opening 11a between opposite ends. The strap section 11 encloses an interior space S. A pair of semicircular dish sections 122 and 123 are connected to the opposite ends of the opening 11a. A pair of insertion engagement sections 12 and 13 project from the respective upper surfaces of the dish sections 122 and 123. The insertion engagement sections 12 and 13 are adapted to be interlocked to form a car body latching-unit 111.

Figure 19:
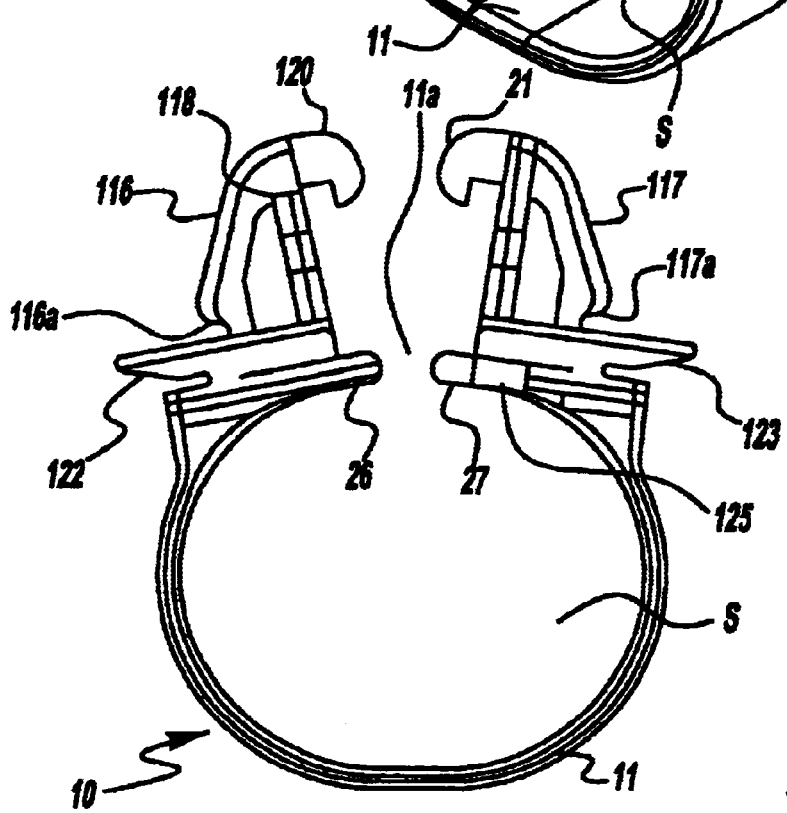
FIG. 19 is a front elevation view of the clamp shown in FIG. 18.
Figure 20:
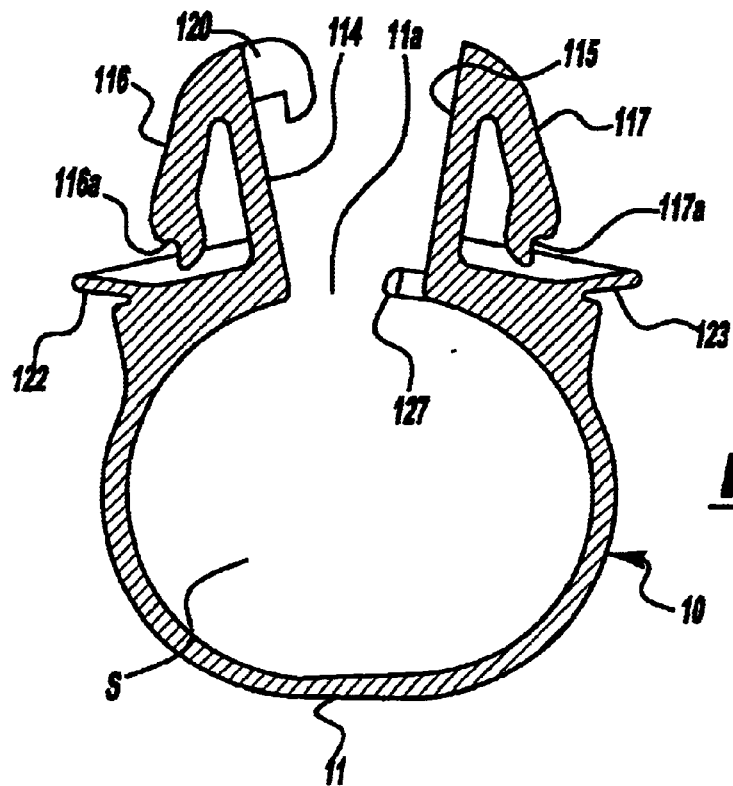
FIG. 20 is a cross sectional view of the clamp shown in FIG. 19.
Figure 21:
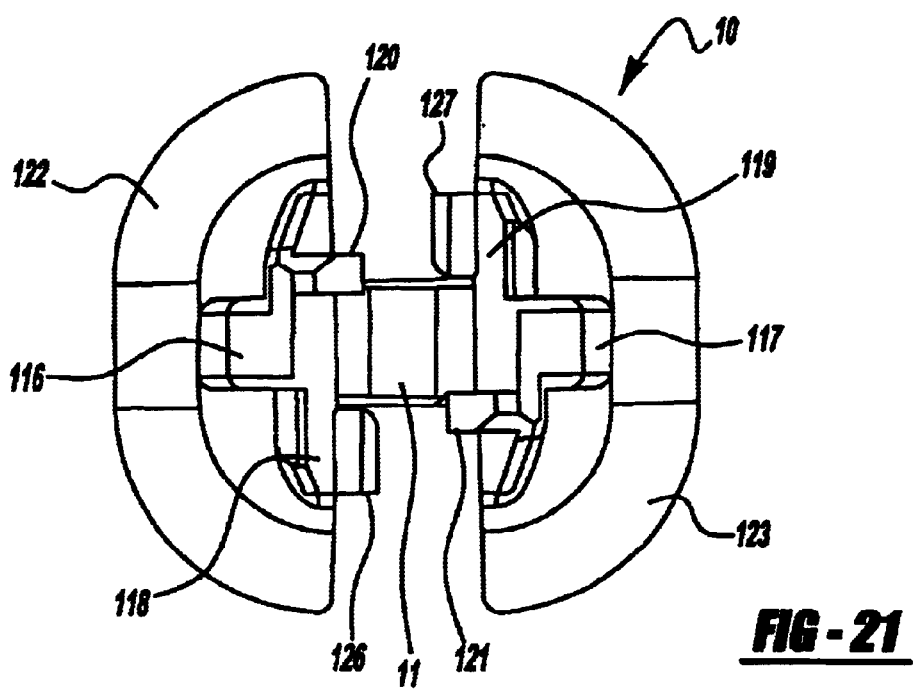
FIG. 21 is a plan view of the clamp shown in FIG. 19.
Figure 22:
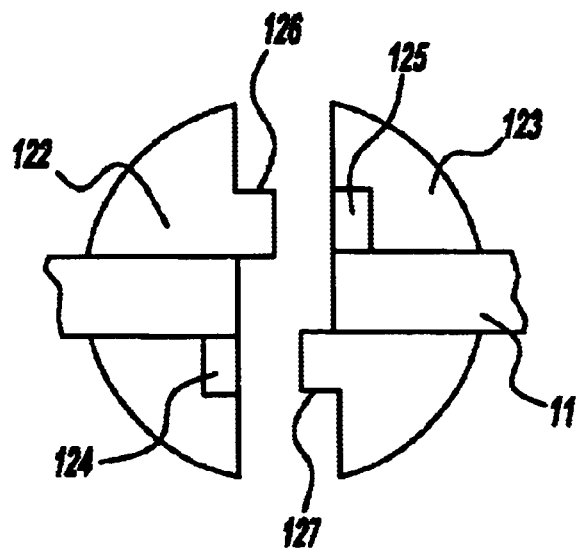
FIG. 22 is a bottom view of the clamp shown in FIG. 19.

The one insertion engagement section 13 includes an axle plate portion 115 that stands on the upper surface of the one semicircular dish section 123. A wing portion 117 is bent down and outwardly from a central part of an upper end of the axle plate portion 115. The wing portion 117 is provided on a lower end with a stepped latching portion 117a. A reversed L-shaped locking portion 121 in cross section projects inwardly from one side of an upper end of the axle plate portion 115. A receiving portion 119 is formed on the other side of the upper end of the axle plate portion 115. Further, as shown in FIGS. 19, 21, and 22, a rib 127, to prevent lateral shifting, projects from the other side of a lower end of the axle plate portion 115 at a symmetrical position with respect to the locking portion 121. As shown in FIGS. 19 and 22, a depression 125, which receives rib 126, is formed in the one side of the lower end of the axle plate portion 115.

The other insertion engagement section 12 has a symmetrical shape with respect to the insertion engagement section 13. The other insertion engagement section 12 includes an axle plate portion 114 that stands on the upper surface of the other semicircular dish section 122. A wing portion 116 is bent down and outwardly from a central part of an upper end of the axle plate portion 114. The wing portion 116 has a lower end with a stepped latching portion 116a. A receiving portion 118 is formed on the one side of the upper end of the axle plate portion 114. A reversed L-shaped locking portion 120 in cross section projects inwardly from the other side of an upper end of the axle plate portion 114. Further, as shown in FIGS. 19, 21, and 22, a rib 126, to prevent lateral shifting, projects from the one side of a lower end of the axle plate portion 114 at a symmetrical position with respect to the locking portion 120. As shown in FIG. 22, a depression 124, which receives rib 127, is formed in the other side of the lower end of the axle plate portion 114. Thus, the locking portions 120 and 121 are opposed to the receiving portions 118 and 119. The ribs 126 and 127 are opposed to the depressions 125 and 124.

Figure 23:
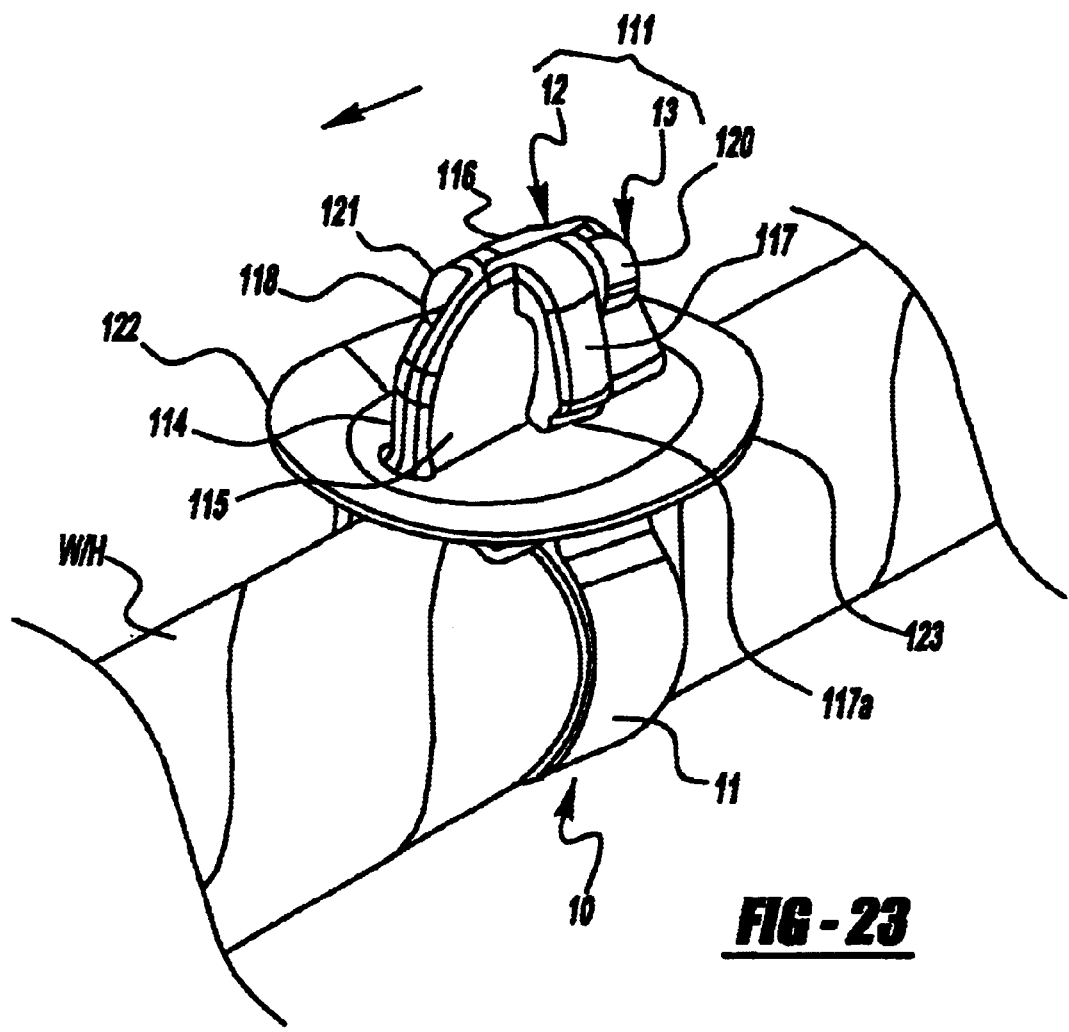
FIG. 23 is a perspective view of the clamp of FIG. 18 that is attached to a wire harness.

Next, an operation to attach the clamp 10 to the wire harness W/H will be described below. The wire harness W/H is inserted through the opening 11a defined between the spaced insertion engagement sections 12 and 13 of the clamp 10 shown in FIG. 18. The wire harness W/H is inserted into the interior space S enclosed by the C-shaped annular strap section 11. As shown in FIGS. 23 and 24, the two insertion engagement sections 12 and 13 are interlocked together. The locking portion 120 of the insertion engagement section 12 is hooked on the receiving portion 119 of the other insertion engagement section 13. Simultaneously, the locking portion 121 of the other insertion engagement section 13 is hooked on the receiving portion 118 of the insertion engagement section 12. Thus, the interlocked insertion engagement sections 12 and 13 form the car body latching-unit 111. The semicircular dish sections 122 and 123 form a circular dish.

Figures 24A, 24B:
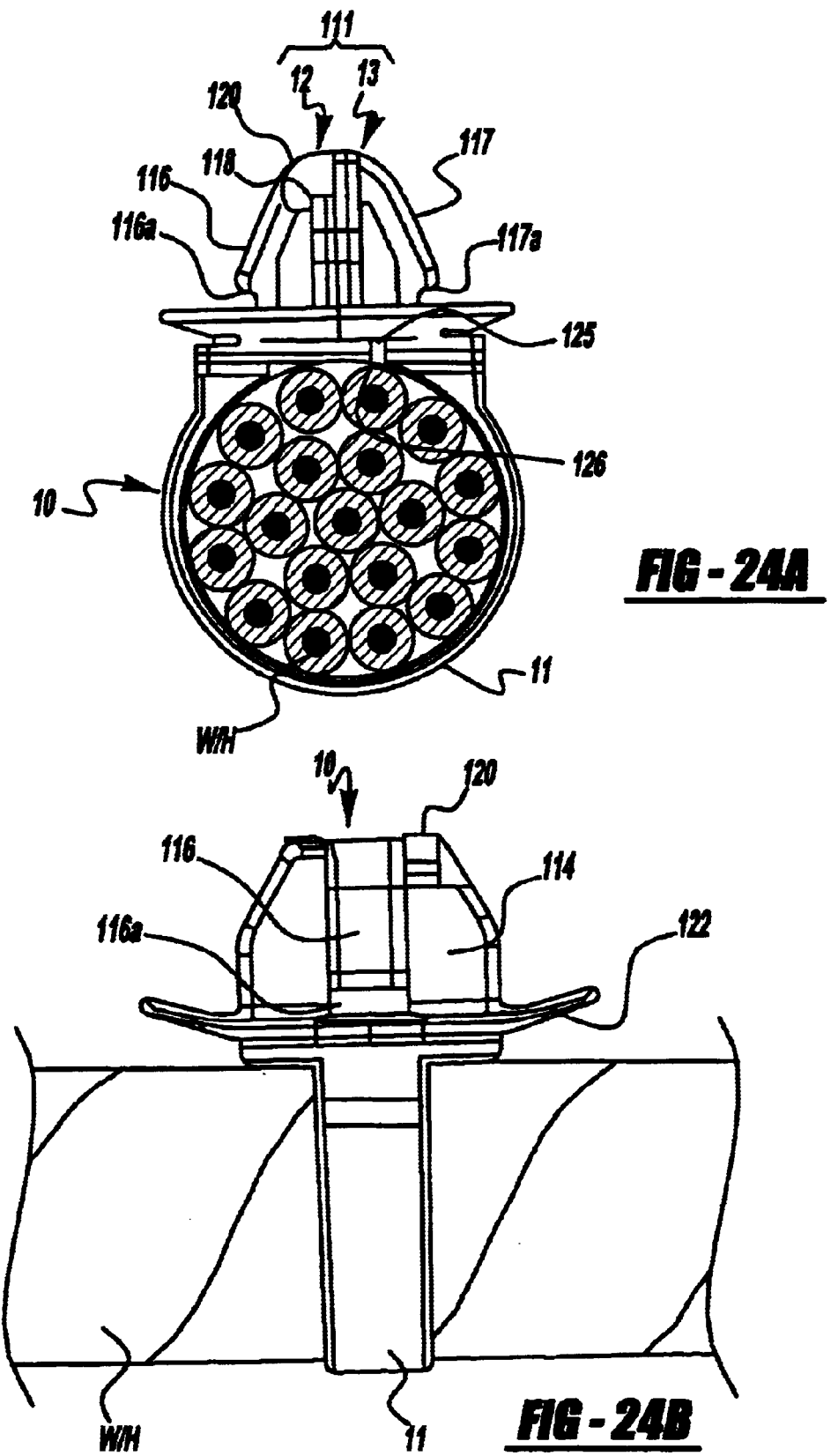
FIG. 24A is a cross sectional view of the clamp shown in FIG. 23.
FIG. 24B is a side elevation view of the clamp shown in FIG. 23.

Under this interlocking condition, as shown in FIG. 24A, the rib 126 of the one insertion engagement section 12 is fitted in the depression 125 of the other insertion engagement section 13. The rib 127 of the other insertion engagement section 13 is fitted into depression 124 of the insertion engagement section 12.

Thus, the locking portions 120 and 121 are hooked on the receiving portions 118 and 119, thereby securing the portions 120 and 121 to the axle plate portions 114 and 115. Accordingly, the portions 120 and 121 may be disengaged from the portions 114 and 115 in the vertical direction. On the other hand, it is possible to prevent the one insertion engagement section 12 from shifting laterally from the other insertion engagement section 13, since the side surfaces of the locking portions 120 and 121 come into contact with the wing portions 116 and 117. It is also possible to prevent the one insertion engagement section 12 from shifting laterally in the opposite direction from the other insertion engagement section 13, since the ribs 126 and 127 are fitted in the depressions 125 and 124. Since the ribs 126 and 127 are not locked but engaged with the depressions 124 and 125, the ribs 126 and 127 can be easily disengaged from each other.

Figure 26:
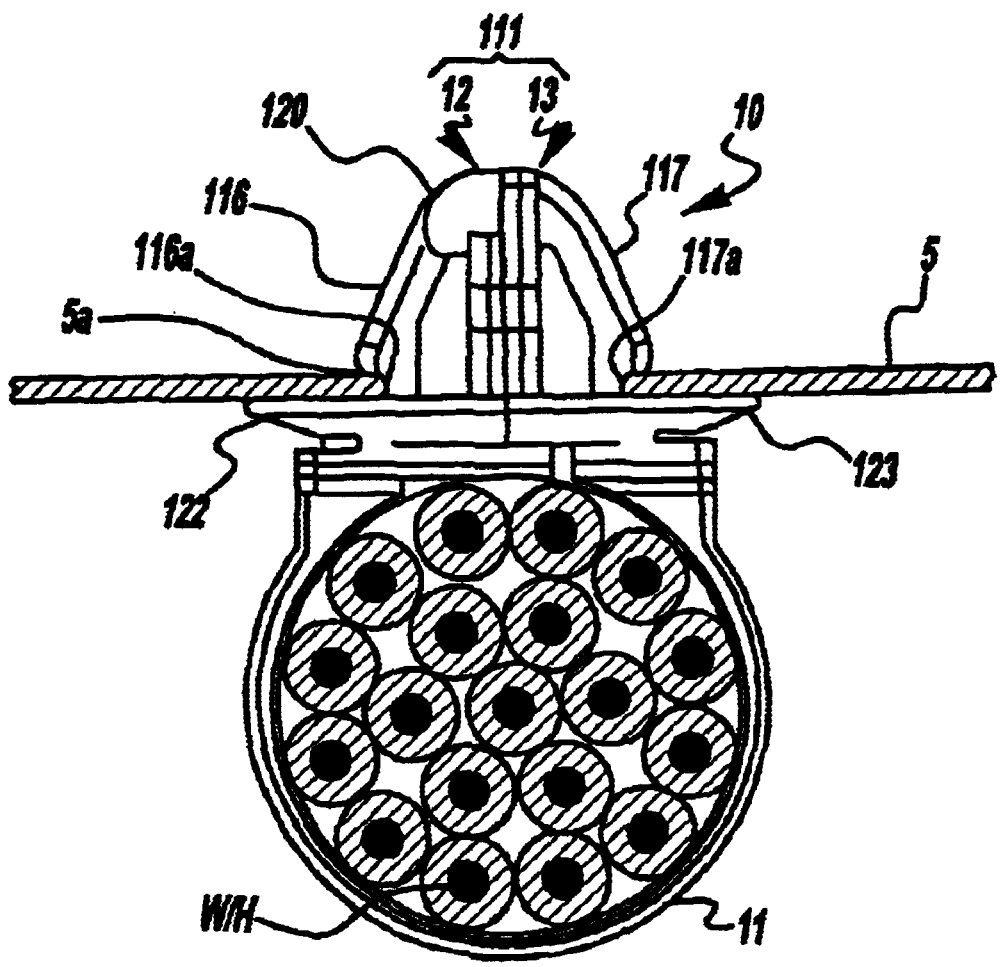
FIG. 26 is a side elevation view of the clamp, illustrating the clamp being inserted into and locked in the through-hole in the car body panel.

The car body latching-unit 111 formed when the insertion engagement sections 12 and 13 are interlocked includes a pair of wing portions 116 and 117. The wing portions 116 and 117 are bent down in the right and left sides from the distal ends of the axle plate portions 114 and 115, respectively. The stepped latching portions 116a and 117a are on lower ends of the wing portions 116 and 117. A distance between distal ends of the stepped latching portions is set to be greater than an inner diameter of the through-hole H in the car body panel P. When the stepped latching portions 116a and 117a are inserted in the through-hole H, as shown in FIG. 26, peripheries of the through-hole H at front and rear sides are clamped between the stepped latching portions 116a, 117a and the dish sections 122 and 123.

The above construction does not require any tape T or tool 6 that is required by conventional clamps 1 or 2, nor does it require the work to attach the clamp to the wire harness W/H. The pair of insertion engagement sections 12 and 13 are interlocked merely by hooking the locking portions 120 and 121 on the receiving portions 118 and 119. This can dramatically enhance an attachment work of the clamp.

Since it is not necessary to cut off the annular strap section 11, an edge surface of a cut end of the section 28 does not interfere with an adjacent wire harness or a worker's hand. Also, there is no waste of material.

Figure 25:
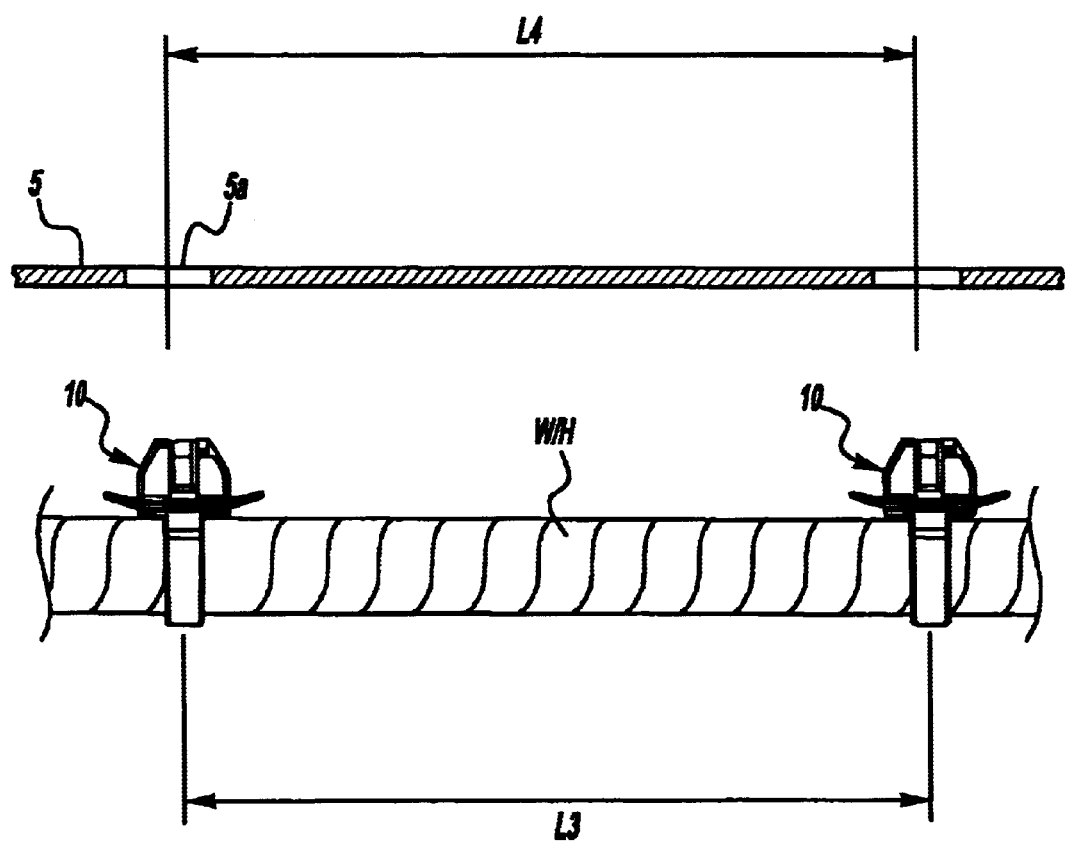
FIG. 25 is an explanatory view illustrating an operation of attaching the clamp to a through-hole in a car body panel.

Although the conventional clamp was completely secured to the wire harness W/H by the tape or fastening tool, the clamp 10 of the present invention contains the wire harness W/H loosely in the interior space S enclosed by the annular strap section 11 with the insertion engagement sections 12 and 13 being interconnected. In the case where a plurality of clamps 10 are attached to the wire harness W/H at given intervals in length, as shown in FIG. 25, even if a pitch L3 between the adjacent clamps 10 does not accord with a pitch L4 between the adjacent through-holes H in the car body panel P, it is possible to correct the positions of the clamps 10 on the wire harness W/H by disengaging the locking portions 120 and 121 from the receiving portions 118 and 119.

Figure 27:
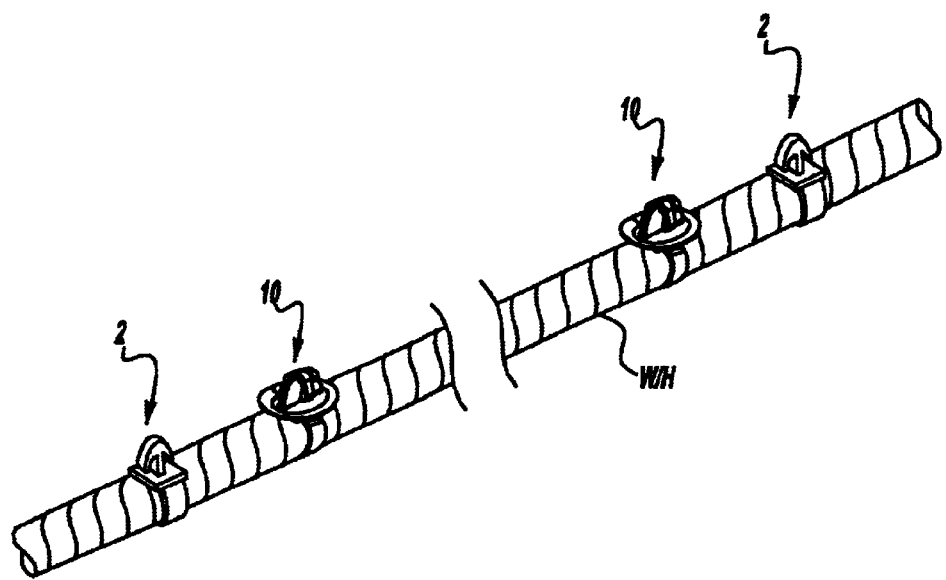
FIG. 27 is a schematic perspective view of a wire harness to which the clamps are attached.

In more detail, as shown in FIG. 27, a control of a dimension tolerance is required in a wire harness W/H, such as a floor harness, an engine harness, an engine compartment harness, or the like. In this case, the conventional band type clamps 2 or the like are completely secured to the given positions and the clamps 10 of the present invention are attached to the wire harness W/H between the clamps 2.

FIGS. 28A and 28B show a sixth embodiment of a clamp in accordance with the present invention.

A clamp 10 in the sixth embodiment includes a single locking portion 120, a single receiving portion 119, a single rib 126 to prevent of lateral shifting, and a single depression 125. The rib 126 and depression 125 are disposed in symmetry with the locking portion 120 and receiving portion 119 with respect to the wing portions 116 and 117. The above construction will reduce a force for hooking the locking portion 120 on the receiving portion 119 to interlock the one insertion engagement section 12' and the other insertion engagement section 13'.

Since the rib 126 and the depression 125 are disposed in symmetry with the locking portion 120 and receiving portion 119, when the one insertion engagement section 12' slides at one lateral side with respect to the other insertion engagement section 13', the locking portion 120 comes into contact with the wing portion 117 to prevent lateral shifting. When the one insertion engagement section 12' slides at the other lateral side with respect to the other insertion engagement section 13', the rib 126 comes into contact with the depression 125 to prevent lateral shifting.

Since the other constructions in the second embodiment are the same as those of the first embodiment, explanations of them are omitted here.

Figure 29A:
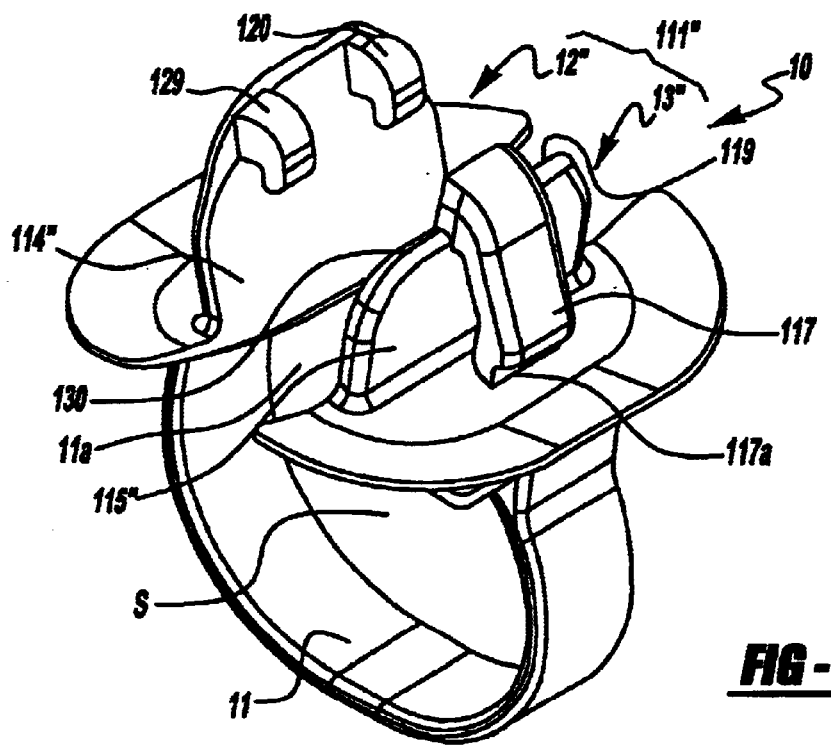
FIG. 29A is a perspective view of a seventh embodiment of a clamp in accordance with the present invention.
Figure 29B:
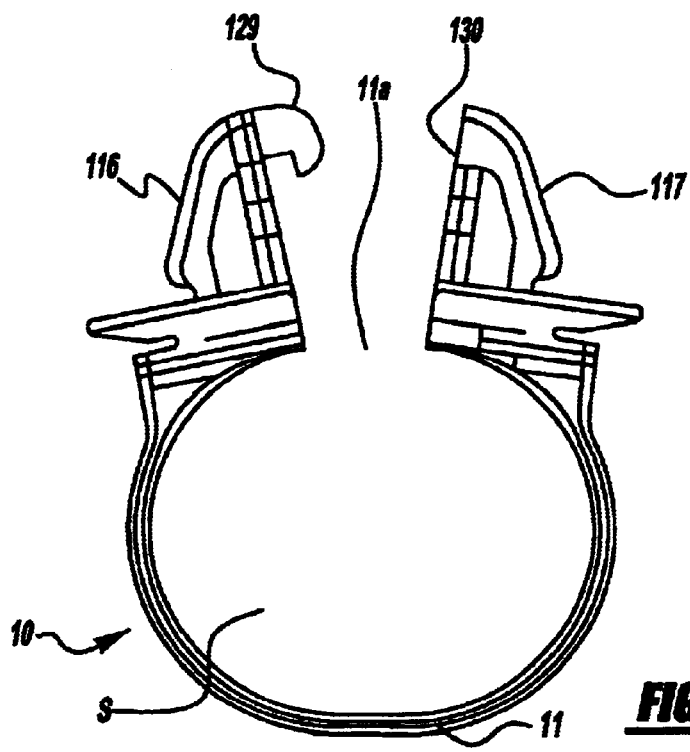
FIG. 29B is a front elevation view of the clamp shown in FIG. 29A.
Figure 30A:
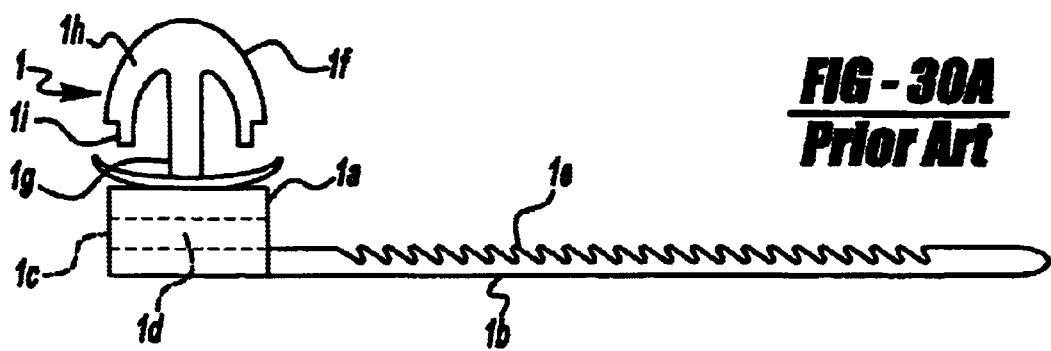
FIGS. 30A through 30C are front elevation views of a conventional band type clamp, illustrating operations for attaching the clamp to the wire harness and locking the clamp on the car body panel.
Figure 30B:
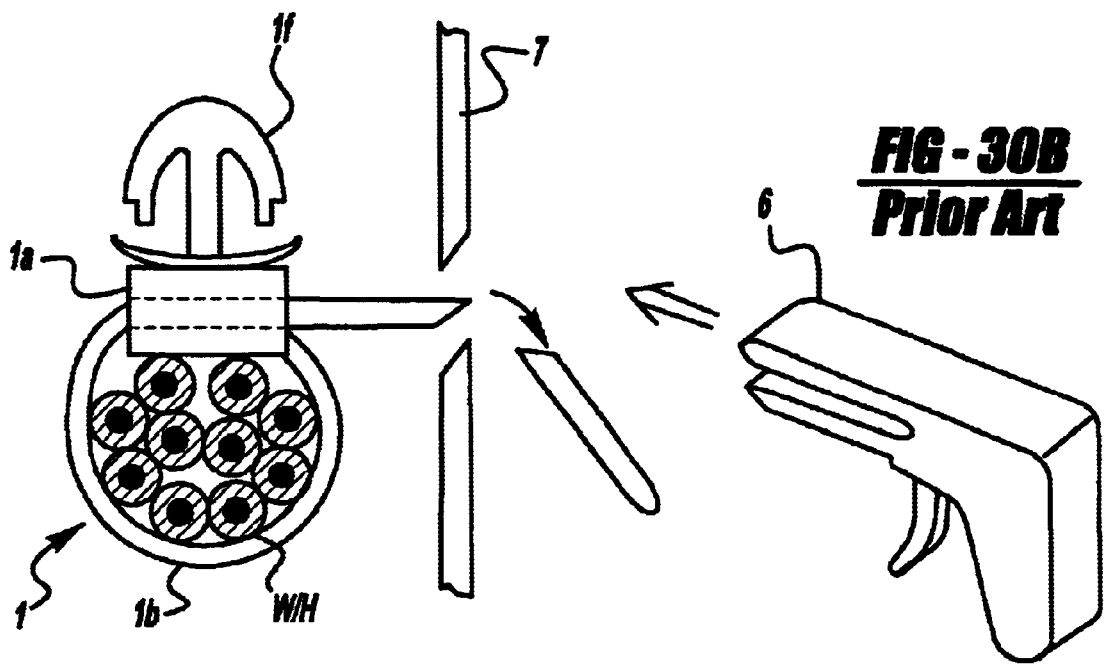
Figure 30C:
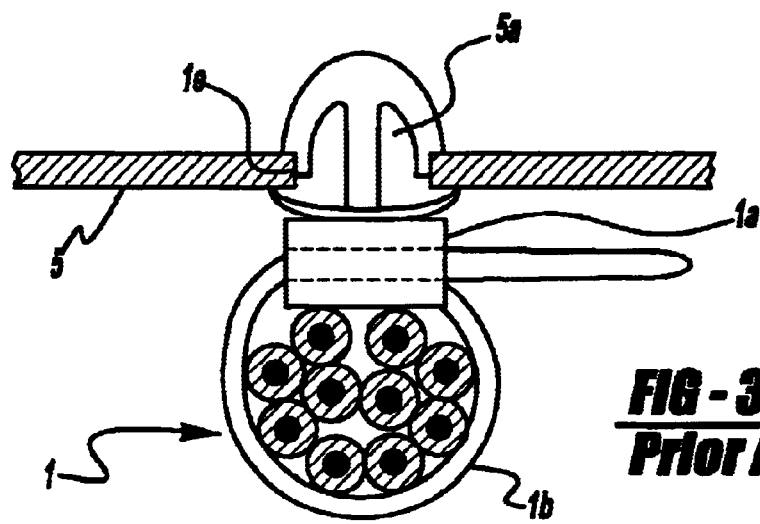
Figure 31A:
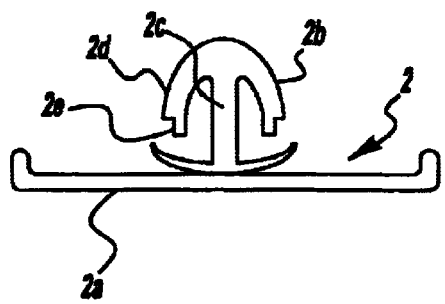
FIGS. 31A through 31C are front elevation views of a conventional base plate type clamp, illustrating operations for attaching the clamp to the wire harness and locking the clamp on the car body panel.
Figure 31B:
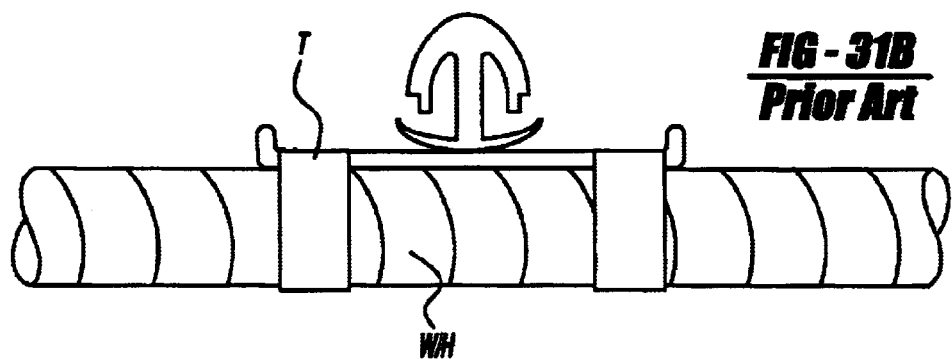
Figure 31C:
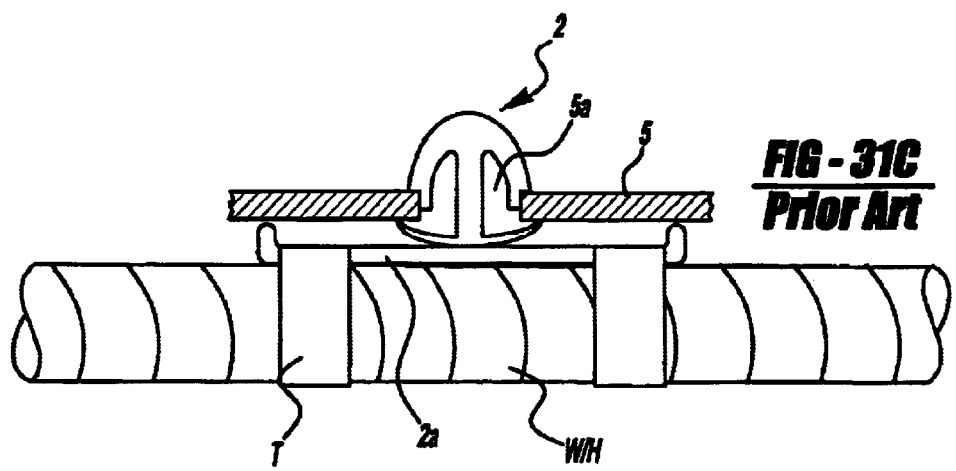

FIGS. 29A and 29B show a seventh embodiment of a clamp in accordance with the present invention.

A clamp 10 in the seventh embodiment includes reversed L-shaped locking portions 120 and 129 in cross section projecting from opposite sides of an upper end of an axle plate portion 114" of the one insertion engagement section 12". Receiving portions 119 and 130 are formed on opposite sides of an upper end of an axle plate portion 115" of the other insertion engagement section 13". The clamp 10 has no ribs and depressions in his embodiment.

The above construction prevents lateral shifting of the insertion engagement sections 12" and 13" with the locking portions 120 and 129 hooked on the receiving portions. Accordingly, when the one insertion engagement section 12" slides laterally with respect to the other insertion engagement section 13", the one locking portion 120 comes into contact with the wing portion 117. When the one insertion engagement section 12" slides laterally in a reverse direction with respect to the other insertion engagement section 13", the other locking portion 129 comes into contact with the wing portion 117.

Since the other constructions in the seventh embodiment are the same as those of the fifth embodiment, explanations of them are omitted here.

From the above description of the invention, those skilled in the art will perceive improvements, changes and modifications. Such improvements, changes and modifications within the skill of the art are intended to be covered by the appended claims.

What is claimed is:

1. A clamp to be attached to a wire harness and inserted into and locked in a through-hole in a car body panel, comprising:
    an annular strap section enclosing an interior space and defining an opening between opposite ends of said annular strap; and
    a pair of outwardly standing insertion engagement sections connected together with the opposite ends of said annular strap section to oppose each other at opposite ends of said opening;
    each of said insertion engagement sections including an axle plate portion projecting from an end of said opening, a wing portion bent down from a distal end of said axle plate portion, and a stepped latching portion formed on a distal end of said wing portion;
    a dimension of said opening being set to be narrower than a diameter of the wire harness to be contained in said interior space, said wire harness being contained in said interior space while said annular strap section is elastically bent outwardly to widen said opening, after containing said wire harness in said interior space said annular strap section returning to its original position by an elastic recovery to narrow said opening, thereby holding said wire harness in said interior space, said pair of insertion engagement sections to be inserted into the through-hole in the car body panel, after inserting said sections into the through-hole, said stepped latching portions engaging a periphery of the through-hole, thereby locking said wire harness on a car body.

2. A clamp according to claim 1, wherein interlocking members are provided on the opposed surfaces of said axle plate portions of said pair of insertion engagement sections so that said interlocking members are detachably coupled to each other, and said opposed axle plate portions are coupled to each other to close said opening after inserting said wire harness into said interior space enclosed by said annular strap section.

3. A clamp according to claim 1, wherein a support plate extends laterally from each of the opposite ends of said opening, said support plates being arranged in the lateral directions opposite from each other; an auxiliary axle plate portion connected to each of said axle plate portions and standing on each of said support plates; and said auxiliary axle plate portion is provided on each of the opposite ends of said opposed axle plate portions to make each of said axle plate portions wide in width.

4. A clamp according to claim 3, wherein an inclined, stepped portion is provided on each of said opposed surfaces of said axle plate portions to form a thin part toward each of said auxiliary axle plate portions; inclining angles of said stepped portions are arranged in lateral directions opposite from each other; a latching protrusion is provided on a distal end of said stepped portion at a thick part side; a latching depression is provided on a distal end of said stepped portion at a thin part side and at a corner between said auxiliary axle plate portion and a curved portion; and said insertion engagement sections are locked on each other when said latching protrusion is pushed into said latching depression.

5. A clamp according to claim 1, wherein a depression is formed on a substantially central part of said annular strap section to oppose said opening; and opposite ends of said depression serve as support points when said annular strap section is bent outwardly.

6. A clamp according to claim 1, wherein a thin cantilever piece is provided on each of the opposite edges of said opening so that said cantilever pieces extend into said interior space enclosed by said annular strap section to close said opening; said wire harness is contained in said interior space enclosed by said annular strap section while widening said opening; and said cantilever pieces return to their original position by an elastic recovery after containing said wire harness in said interior space.

7. A clamp to be attached to a wire harness and inserted into and locked in a through-hole in a car body panel, comprising:
    an annular strap section enclosing an interior space and defining an opening between opposite ends of said annular strap section; and
    a pair of outwardly standing insertion engagement sections connected together with the opposite ends of said annular strap section to oppose each other at opposite ends of said opening;
    each of said insertion engagement sections including an axle plate portion projecting from an end of said opening, a wing portion bent down from a distal end of said axle plate portion, and a stepped latching portion formed on a distal end of said wing portion;
    at least one reversed L-shaped locking portion in cross section projecting inwardly from at least one of said axle plate portions, and at least one receiving portion on the other of the axle plate portions;

said wire harness being contained in said interior space enclosed by said annular strap section, said insertion engagement sections being interlocked together, said at least one L-shaped locking portion hooked on said at least one receiving portion to close said opening and hold said wire harness in said interior space, said interlocked insertion engagement sections to be inserted into the through-hole in the car body panel, said stepped latching portions of said wing portions to engage a periphery of said through-hole, thereby locking said wire harness on the car body.

8. A clamp according to claim 7, wherein a rib for preventing lateral shifting extends inwardly from a lower end of said axle plate portion of at least one insertion engagement section, and a depression opposing said rib on said axle plate portion in said other insertion engagement section; and wherein said insertion engagement sections are prevented from laterally shifting to contact surfaces of said sections when said rib is fitted in said depression.

* * * * *